(12) United States Patent
Kumagai et al.

(10) Patent No.: US 12,085,938 B2
(45) Date of Patent: Sep. 10, 2024

(54) TRANSPORT SYSTEM, TRANSPORT ROBOT, CONTROL APPARATUS, CONTROL METHOD, AND PROGRAM

(71) Applicant: NEC Corporation, Tokyo (JP)

(72) Inventors: Taichi Kumagai, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 831 days.

(21) Appl. No.: 17/274,588

(22) PCT Filed: Sep. 9, 2019

(86) PCT No.: PCT/JP2019/035324
§ 371 (c)(1),
(2) Date: Mar. 9, 2021

(87) PCT Pub. No.: WO2020/054649
PCT Pub. Date: Mar. 19, 2020

(65) Prior Publication Data
US 2022/0050465 A1     Feb. 17, 2022

(30) Foreign Application Priority Data
Sep. 10, 2018   (JP) .................................. 2018-168683

(51) Int. Cl.
*G05D 1/00*        (2024.01)
(52) U.S. Cl.
CPC .......... *G05D 1/0212* (2013.01); *G05D 1/0227* (2013.01); *G05D 1/0287* (2013.01)
(58) Field of Classification Search
CPC .. G05D 1/0212; G05D 1/0227; G05D 1/0287; B66F 9/063; Y10S 901/01; B60K 1/02; B60P 3/40
See application file for complete search history.

(56) References Cited

U.S. PATENT DOCUMENTS

| 5,026,153 A | 6/1991 | Suzuki et al. |
| 6,522,952 B1 | 2/2003 | Arai et al. |

(Continued)

FOREIGN PATENT DOCUMENTS

| JP | S63-034609 A | 2/1988 |
| JP | H02-232513 A | 9/1990 |

(Continued)

OTHER PUBLICATIONS

International Search Report for PCT Application No. PCT/JP2019/035324, mailed on Nov. 19, 2019.

(Continued)

*Primary Examiner* — Kevin Hurley
*Assistant Examiner* — Michael R Stabley

(57) ABSTRACT

A transport system transports a transport object in a state sandwiching the transport object between a plurality of transport robots, wherein the transport robot comprises: a main body; wheels; a rotation mechanism that makes a contact part rotatable relative to the main body; a drive part(s) mounted on the main body and driving the wheels; a load sensor detecting a load when the contact part contacts the transport object; and an angle sensor that detects a rotation angle of the contact part relative to the main body, wherein using hardware resources, processings are executed to control the drive part so that load and rotation angle approach a first target value and a second target value based on information of a load and a rotation angle detected by the load sensor and the angle sensor.

20 Claims, 23 Drawing Sheets

(56) References Cited

U.S. PATENT DOCUMENTS

| | | | |
|---|---|---|---|
| 7,826,919 B2 * | 11/2010 | D'Andrea | G05D 1/0234 |
| | | | 700/214 |
| 9,315,367 B2 * | 4/2016 | Ooga | B66F 9/07577 |
| 9,707,879 B2 * | 7/2017 | Mecklinger | B66F 9/063 |
| 10,202,061 B2 * | 2/2019 | Scherle | B66F 9/063 |
| 10,549,916 B2 * | 2/2020 | Pajevic | B60G 99/002 |
| 2015/0142249 A1 | 5/2015 | Doga et al. | |

FOREIGN PATENT DOCUMENTS

| | | |
|---|---|---|
| JP | H05-177566 A | 7/1993 |
| JP | H11-198067 A | 7/1999 |
| JP | 2000-042958 A | 2/2000 |
| JP | 2000-203799 A | 7/2000 |
| JP | 2000-343470 A | 12/2000 |
| JP | 2001-213597 A | 8/2001 |
| JP | 2004-337918 A | 12/2004 |
| JP | 2007-111826 A | 5/2007 |
| JP | 2009-006415 A | 1/2009 |
| JP | 5588714 B2 | 10/2011 |
| JP | 2012-188914 A | 10/2012 |
| JP | 2016-175738 A | 10/2016 |
| JP | 6151159 B2 | 6/2017 |
| WO | 2016/192857 A2 | 12/2016 |

OTHER PUBLICATIONS

Yasuhisa Hirata et al., "Transportation of an Object with Unknown Shape by Multiple Mobile Robots in Coordination" Preprints of the 18th Academic Lecture Conference of the Robotics Society of Japan, Sep. 12, 2000, vol. 3, pp. 1025-1026, 3C15, in particular, "4 Cooperative Transportation", fig. 3, non-official translation, Japan.

Japanese Office Action for JP Application No. 2020-546004 mailed on Sep. 13, 2022 with English Translation.

JP Office Communication for JP Application No. 2020-546004, mailed on Jan. 10, 2023 with English Translation.

\* cited by examiner

TRANSPORT SYSTEM, TRANSPORT ROBOT, CONTROL APPARATUS, CONTROL METHOD, AND PROGRAM

FIELD

Description of Related Application

This application is a National Stage Entry of PCT/JP2019/035324 filed on Sep. 9, 2019, which claims priority from Japanese Patent Application 2018-168683 filed on Sep. 10, 2018, the contents of all of which are incorporated herein by reference, in their entirety.

The present invention relates to a transport system, a transport robot, a control apparatus, a control method, and a program.

BACKGROUND

There are the followings as transport systems in which a transport object is transported by collaborating (coordinating) multiple transport robots.

For example, transport systems of Patent Literatures (PTLs) 1 and 2 are configured so that a transport object is transported by installing a turntable (position error absorption mechanism) in each of a plurality of transport robots, and arranging a transport object (freight) so as to straddle the plurality of turntables.

Also, a transport system of PTL 3 is configured so that a transport object is transported by providing an arm and a hand for each of a plurality of transport robots, and rotatably supporting the transport object from below by a plurality of hands.

Further, a transport system of PTL 4 is configured so that a transport object is transported by providing a robot arm and a hook for each of a plurality of transport robots, and lifting the transport object by a plurality of hooks.

Furthermore, a transport system of PTL 5 is configured so that a transport object is transported by providing a movable arm and a gripping mechanism for each of a plurality of transport robots, and gripping the transport object due to the plurality of grip mechanisms.

[PTL 1] JP6151159B
[PTL 2] JP5588714B
[PTL 3] JP2000-42958A
[PTL 4] JP2007-111826A
[PTL 5] JP2009-6415A

SUMMARY

The following analysis is given by the inventors of the present application.

In the transport systems of PTL 1 and 2, a manual or reloading robot for reloading the transport object on the turntables are required. Also, in the logistics business (transportation business), in order to make it easy to move, the freight is often carried on a trolley (including a dolly), however, in the transport system of PTLs 1 and 2, the trolley cannot be transported while carrying the freight (transport object) on the trolley.

Also, in the transport system of PTL 3, it is necessary to provide a support rod in the transport object for being possible to support the transport object by a hand, and it is not possible to transport the transport object without a support rod.

Further, in the transport system of PTL 4, it is necessary to attach an eyebolt to the transport object for being possible to hang the transport object by a hook, and it is not possible to transport the transport object to which the eyebolt cannot be attached.

Furthermore, in the transport system of PTL 5, it is necessary to provide a grip portion in the transport object for being possible to grip the transport object by a grip mechanism, and it is not possible to transport the transport object without the grip portion.

In logistics operations, carts of various forms (shape, size, etc.) are used depending on the shipper, etc., however, it is desired that the cart can be stably carried as it is without modifying the cart (transport object) on which the freight is placed.

It is a main object of the present invention to provide a transport system, a transport robot, a control apparatus, a control method and a program which can contribute to stable transportation of various types of transport object without modifying the transport object and without reloading the transport object.

Solution to Problem

A transport system according to a first aspect is a transport system that transports a transport object in a state sandwiching the transport object between a plurality of transport robots. The transport robot comprises: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The transport system, using hardware resources, executes processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

A transport robot according to the second aspect is a transport robot configured to transport a transport object while sandwiching the transport object by cooperating with another transport robot(s). The transport robot comprises: a main body; wheels; a contact part that contacts the transport object; a rotation mechanism that makes the contact part rotatable relative to the main body; a drive part(s) that is/are mounted on the main body and configured to drive the wheels; a control part that controls the drive part(s); a load sensor that detects a load when the contact part contacts the transport object; and an angle sensor that detects a rotation angle of the contact part relative to the main body. The control part executes processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

A control apparatus according to the third aspect is a control apparatus that controls a plurality of transport robots that sandwich a transport object and cooperate with each other to transport the transport object. The transport robot comprises: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The control apparatus execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

A control method of transport robots according to a fourth aspect is a control method of the transport robots, controlling a plurality of transport robots that sandwich a transport object and cooperate with each other to transport the transport object. The transport robot comprises: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The control method of the transport robot comprises: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

A program according to a fifth aspect is a program executed by a transport robot configured to transport a transport object in a state sandwiching the transport object by cooperating with another transport robot(s). The transport robot comprises: a main body; wheels; a contact part that contacts the transport object; a rotation mechanism that makes the contact part rotatable relative to the main body; a drive part(s) that is/are mounted on the main body and configured to drive the wheels; a control part that controls the drive part(s); a load sensor that detects a load when the contact part contacts the transport object; and an angle sensor that detects a rotation angle of the contact part relative to the main body. The program causes the control part to execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

A program according to a sixth aspect is a program executed by a control apparatus that controls a plurality of transport robots that sandwich a transport object and cooperate with each other to transport the transport object. The transport robot comprises: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The program causes the control apparatus to execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

The program can be recorded on a computer-readable storage medium. The storage medium may be a non-transient such as a semiconductor memory, a hard disk, a magnetic recording medium, or an optical recording medium. Also, in the present disclosure, it is also possible to implement it as a computer program product. The program is input to a computer apparatus from an input device or from outside via a communication interface; is stored in a storage device; causes a processor to drive according to predetermined steps or processings; can cause to display processing results thereof, including an intermediate state via a display device step by step as necessary; or can cause to communicate with outside via a communication interface. The computer apparatus for that purpose typically comprises: for example, a processor; a storage device; an input device; a communication interface; and, if necessary, a display device, that can be connected to each other via a bus.

According to the first to sixth aspects, it is possible to contribute to stable transportation of various types of transport object as it is without modifying the transport object and without reloading the transport object.

PREFERRED MODES

Figure 1:
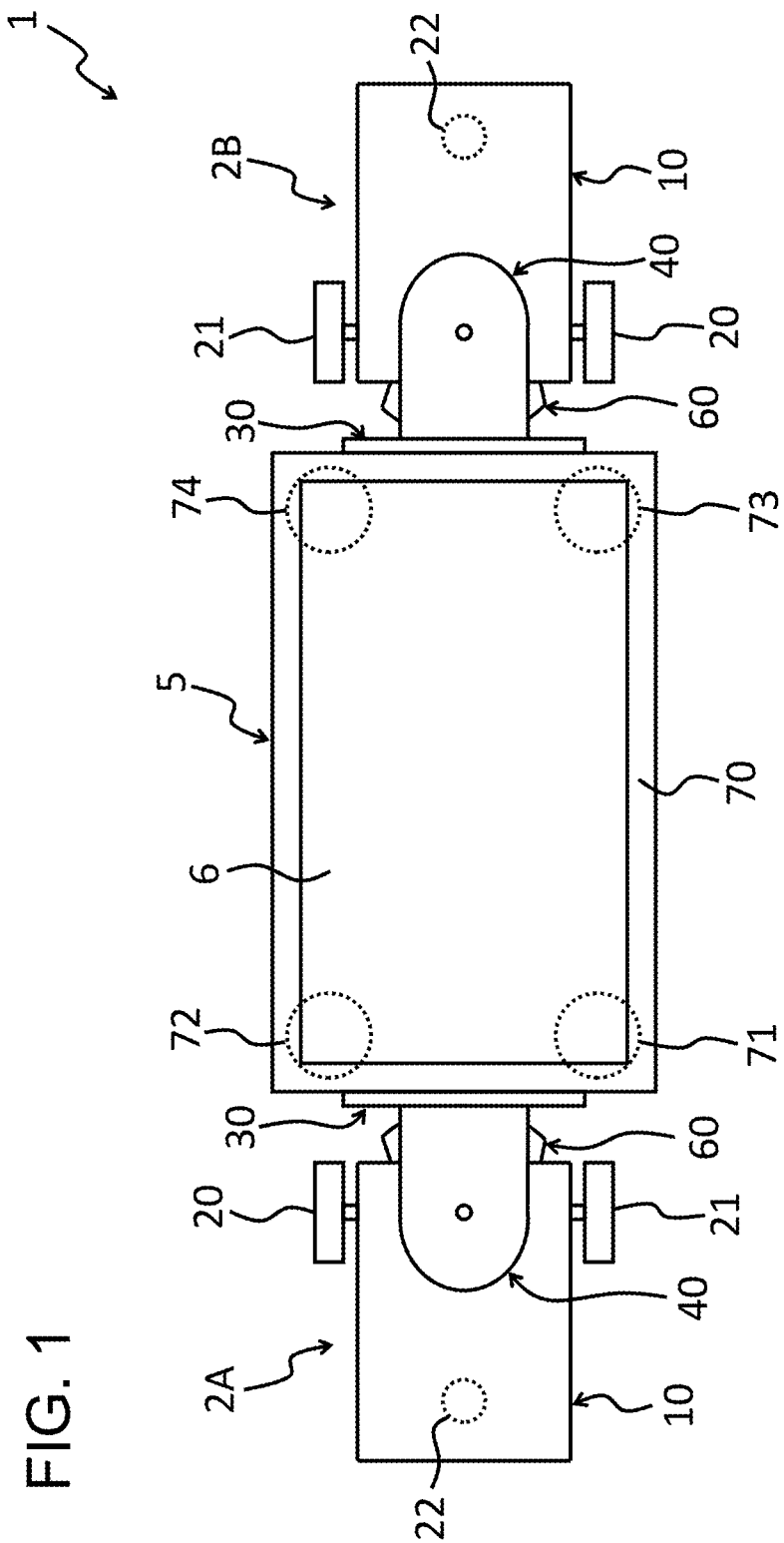
FIG. 1 is a plan view schematically showing an example of a state in which the transport system according to a first exemplary embodiment is transporting a transport object.

In the present disclosure described below, a transport system according to mode 1 and its modified mode(s) may be appropriately selected and combined.

As the transport system according to the mode 1, it is possible to provide a transport system that transports a transport object in a state sandwiching the transport object between a plurality of transport robots. The transport robot may comprise: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The transport system, using hardware resources, may execute processings of: controlling the drive part(s) so that when (or during) the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

As a modification mode of the transport system according to the mode 1, the processing of controlling the drive part(s) may execute processings of: determining the first target value according to at least a weight of the transport object; acquiring information of the load detected by the load sensor; and controlling the drive part(s) so that a load when the contact part contacts the transport object a load approaches the determined first target value based on the acquired information of the load.

As a modification mode of the transport system according to the mode 1, the contact part may comprise: two plates; and an elastic member arranged between the two plates, and the load sensor may detect a load at a time when the contact part contacts the transport object based on a distance between the two plates.

As a modification mode of the transport system according to the mode 1, the processing of controlling the drive part(s) may execute processings of: determining the second target value according to at least curvature during transportation of the transport object; acquiring information of the rotation angle detected by the angle sensor; and controlling the drive part(s) so that the rotation angle of the contact part relative to the main body approaches the determined second target value based on the acquired information of the rotation angle.

As a modification mode of the transport system according to the mode 1, the transport robot may further comprise a control part that executes controlling the drive part(s), as the hardware resources.

As a modification mode of the transport system according to the mode 1, the transport system may further comprise a control apparatus that controls the transport robots, as the hardware resources. The control apparatus may execute controlling the drive part(s). The processing of controlling the drive part(s) may comprise processings of: acquiring information of the load detected by the load sensor from the transport robot and controlling the drive part(s) based on the acquired information of the load; and acquiring information of the rotation angle detected by the angle sensor from the transport robot and controlling the drive part(s) based on the acquired information of the rotation angle.

In the present disclosure, as a transport robot according to a mode 2 may be a transport robot that is configured to transport a transport object while sandwiching the transport object by cooperating with another transport robot(s). The transport robot may comprise: a main body; wheels; a contact part that contacts the transport object; a rotation mechanism that makes the contact part rotatable relative to the main body; a drive part(s) that is/are mounted on the main body and configured to drive the wheels; a control part that controls the drive part(s); a load sensor that detects a load when the contact part contacts the transport object; and an angle sensor that detects a rotation angle of the contact part relative to the main body. The control part may execute processings of: controlling the drive part(s) so that when the contact part contacts the transport object, the load approaches a first target value based on information of a load detected by the load sensor; and controlling the drive part(s)

so that the rotation angle of the contact part relative to the main body approaches a second target value based on information of a rotation angle detected by the angle sensor.

In the present disclosure, a control apparatus according to a mode 3 may be a control apparatus that controls a plurality of transport robots that sandwich a transport object and cooperate with each other to transport the transport object. The transport robot may comprise: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The control apparatus may execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

In the present disclosure, a control method of transport robots according to a mode 4 may be a control method of transport robots, the control method controlling a plurality of transport robots that sandwich a transport object and cooperate with each other to transport the transport object. The transport robot may comprise: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The control method of the transport robot may comprises: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

In the present disclosure, a program according to a mode 5 may be a program executed by a transport robot that is configured to transport a transport object in a state sandwiching the transport object by cooperating with another transport robot(s). The transport robot may comprise: a main body; wheels; a contact part that contacts the transport object; a rotation mechanism that makes the contact part rotatable relative to the main body; a drive part(s) that is/are mounted on the main body and configured to drive the wheels; a control part that controls the drive part(s); a load sensor that detects a load when the contact part contacts the transport object; and an angle sensor that detects a rotation angle of the contact part relative to the main body. The program may cause the control part to execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

In the present disclosure, a program according to a mode 6 may be a program executed by a control apparatus that controls a plurality of transport robots that sandwich a transport object and cooperate with each other to transport the transport object. The transport robot may comprise: a main body; wheels; a contact part that contacts the transport object; a rotation mechanism that makes the contact part rotatable relative to the main body; a drive part(s) that is/are mounted on the main body and configured to drive the wheels; a load sensor that detects a load when the contact part contacts the transport object; and an angle sensor that detects a rotation angle of the contact part relative to the main body. The program may cause the control apparatus to execute processings of: controlling the drive part(s) so that when the contact part contacts the transport object, the load approaches a first target value based on information of a load detected by the load sensor; and controlling the drive part(s) so that the rotation angle of the contact part relative to the main body approaches a second target value based on information of a rotation angle detected by the angle sensor.

Hereinafter, exemplary embodiments will be described with reference to drawings. When drawing-reference signs are attached in this application, they are solely for the purpose of assisting understanding, and are not intended to be limited to the illustrated modes. Also, the following exemplary embodiments are merely examples, and do not limit the present invention. Further, connecting lines between blocks such as drawings referred to in the following description includes both bidirectional and unidirectional. A one-way arrow schematically shows a flow of a main signal (data), and does not exclude bidirectional. Furthermore, in circuit diagrams, block diagrams, internal configuration diagrams, connection diagrams, etc. shown in the disclosure of the present application, although explicit disclosure is omitted, an input port and an output port exist at the input end and the output end of each connection line, respectively. The same applies to the input/output interface. A program is executed via a computer apparatus, which comprises, for example, a processor, a storage device, an input device, a communication interface, and a display device as required, and the computer apparatus is configured to be able to communicate with inside device(s) or external apparatus(es) (including computer(s)) via a communication interface regardless of whether it is wired or wireless.

Exemplary Embodiment 1

Figure 2:
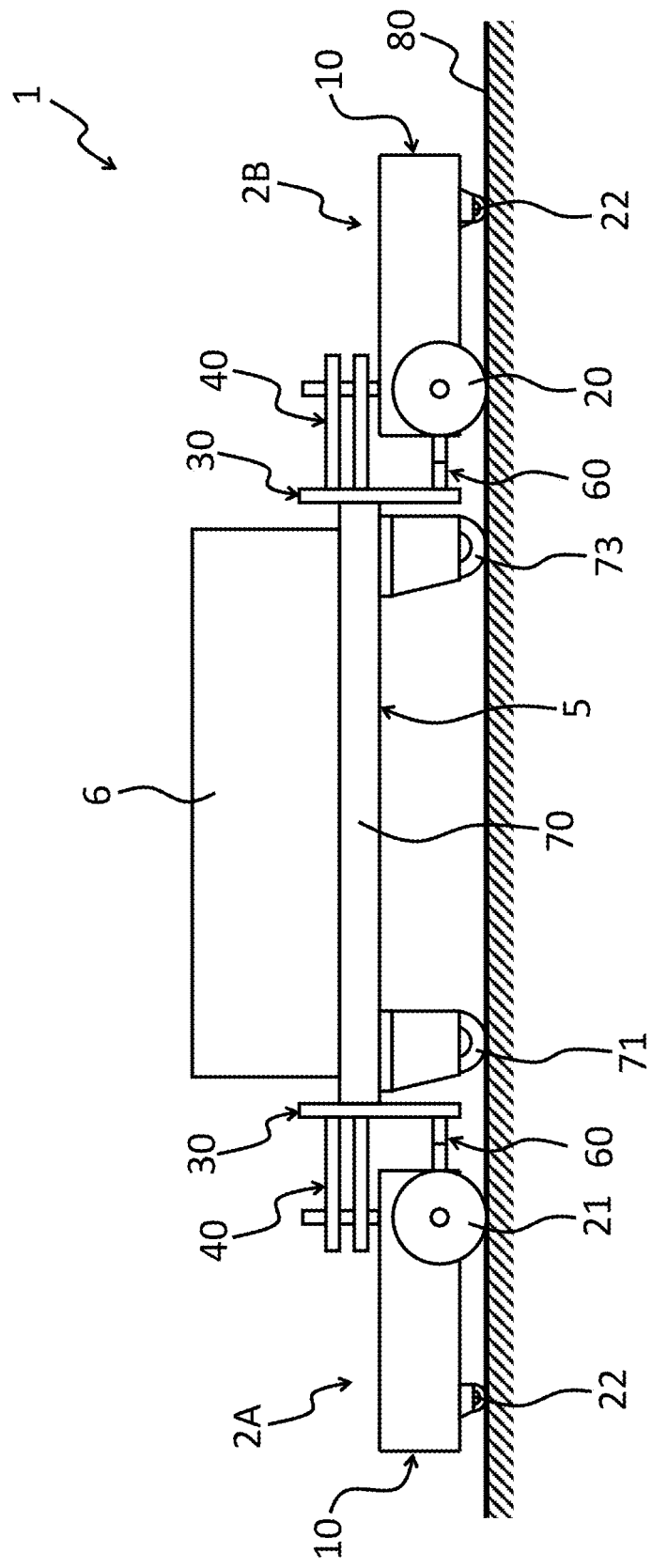
FIG. 2 is a side view schematically showing an example of the state in which the transport system according to the first exemplary embodiment is transporting the transport object.
Figure 3:
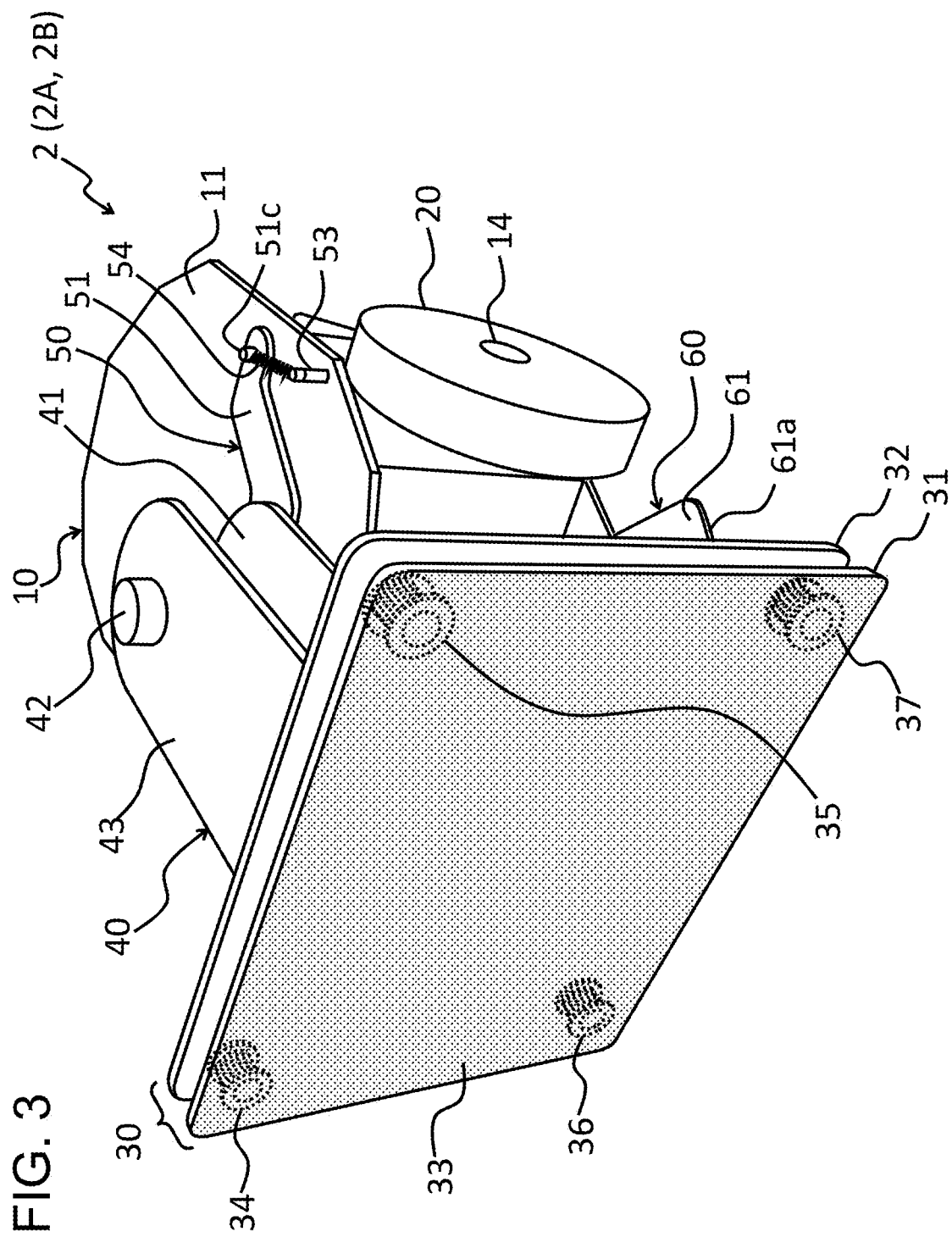
FIG. 3 is an external perspective view schematically showing a configuration of a transport robot in the transport system according to the first exemplary embodiment.
Figure 4:
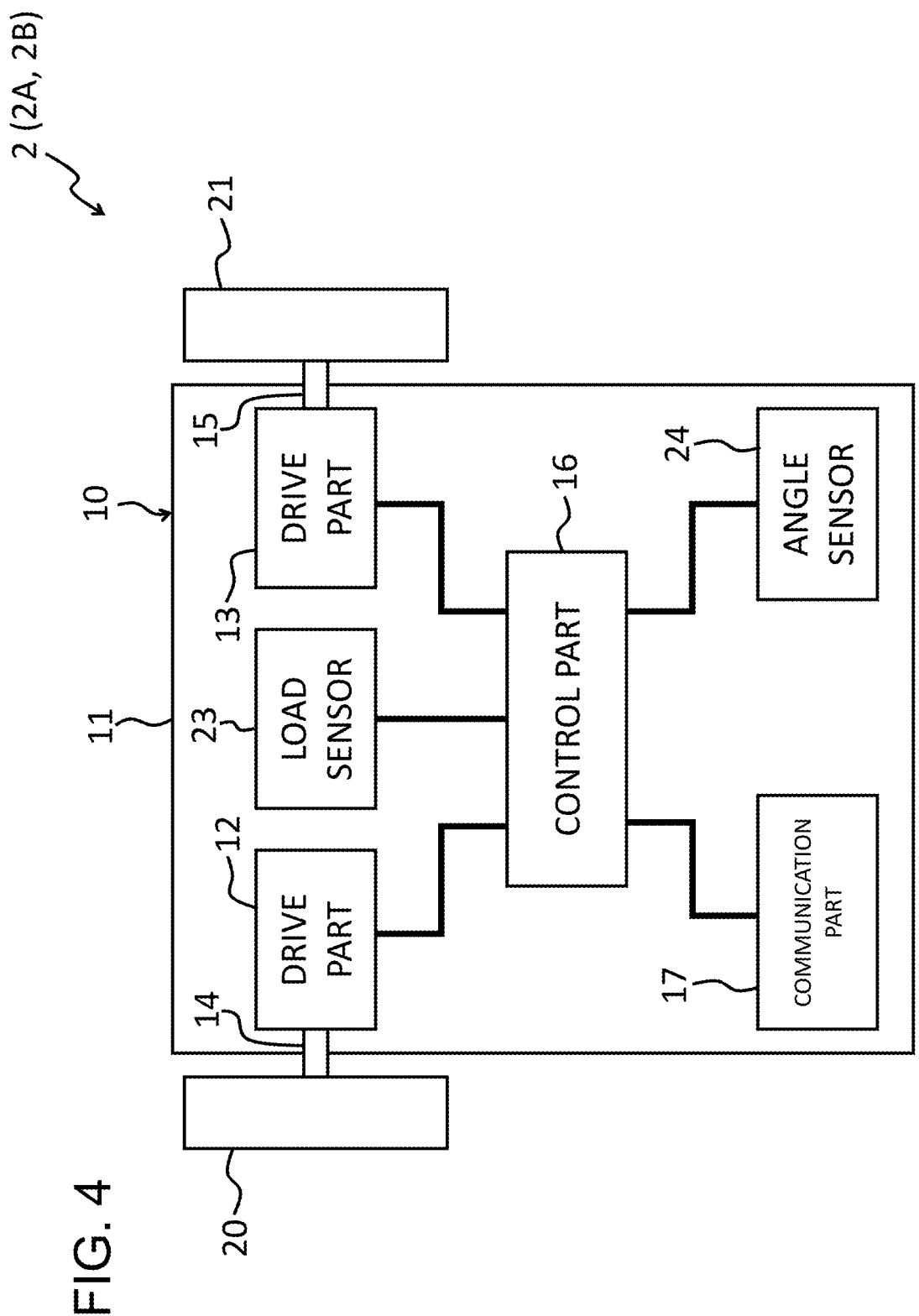
FIG. 4 is a block diagram schematically showing a circuit configuration of a main body of the transport robot in the transport system according to the first exemplary embodiment.
Figure 5:
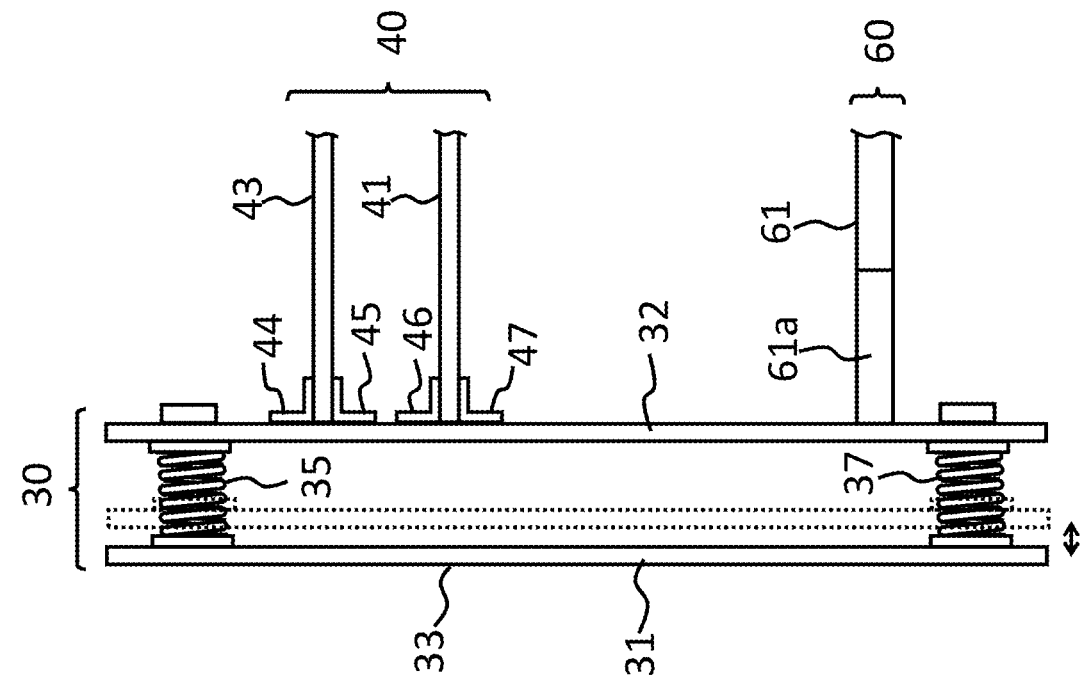
FIG. 5 is a partial left side view for explaining an operation of a contact part of the transport robot in the transport system according to the first exemplary embodiment.
Figure 6:
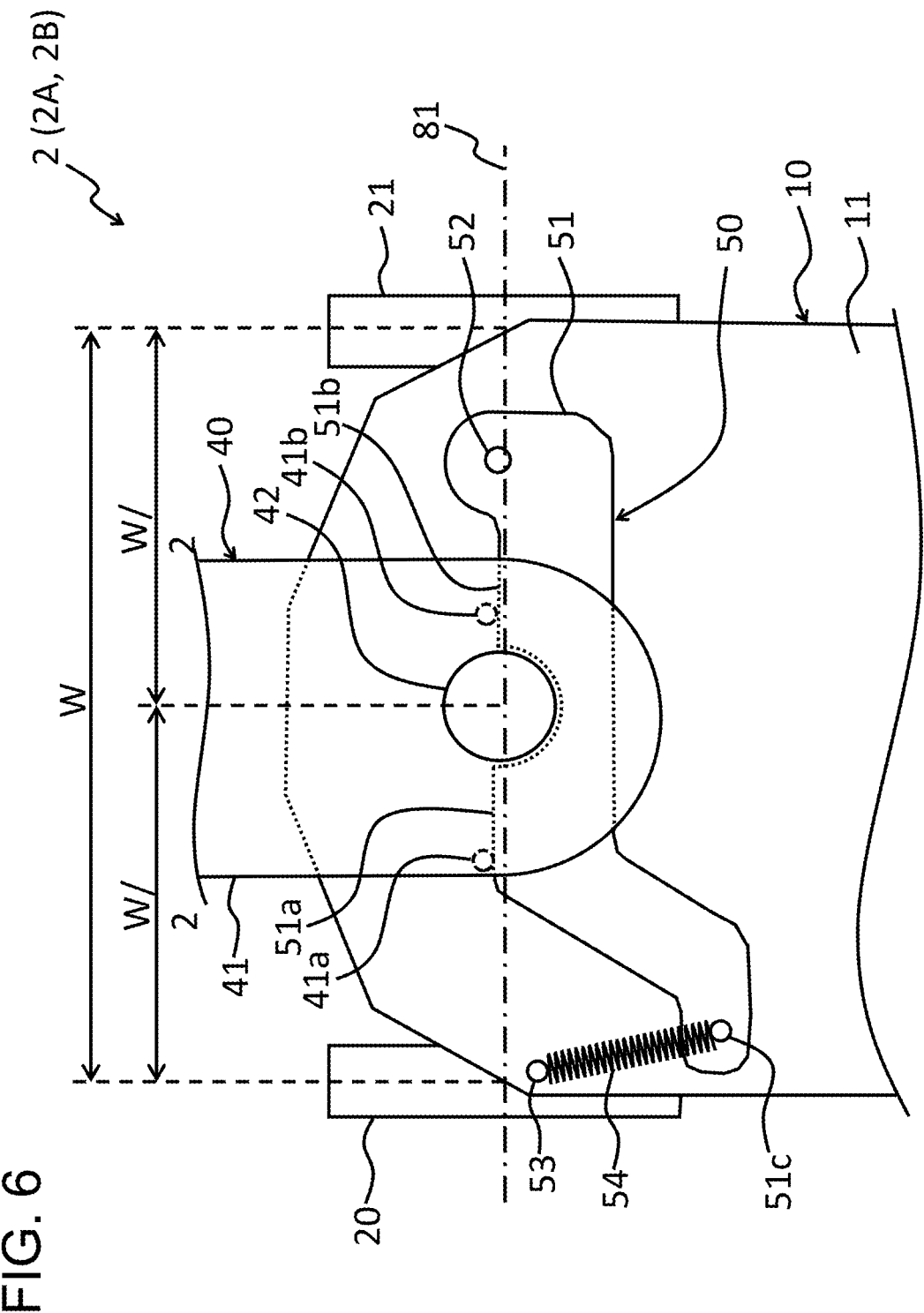
FIG. 6 is a schematic partial plan view for explaining an operation of a rotation mechanism and a restoration mechanism of the transport robot in the transport system according to the first exemplary embodiment.
Figure 7:
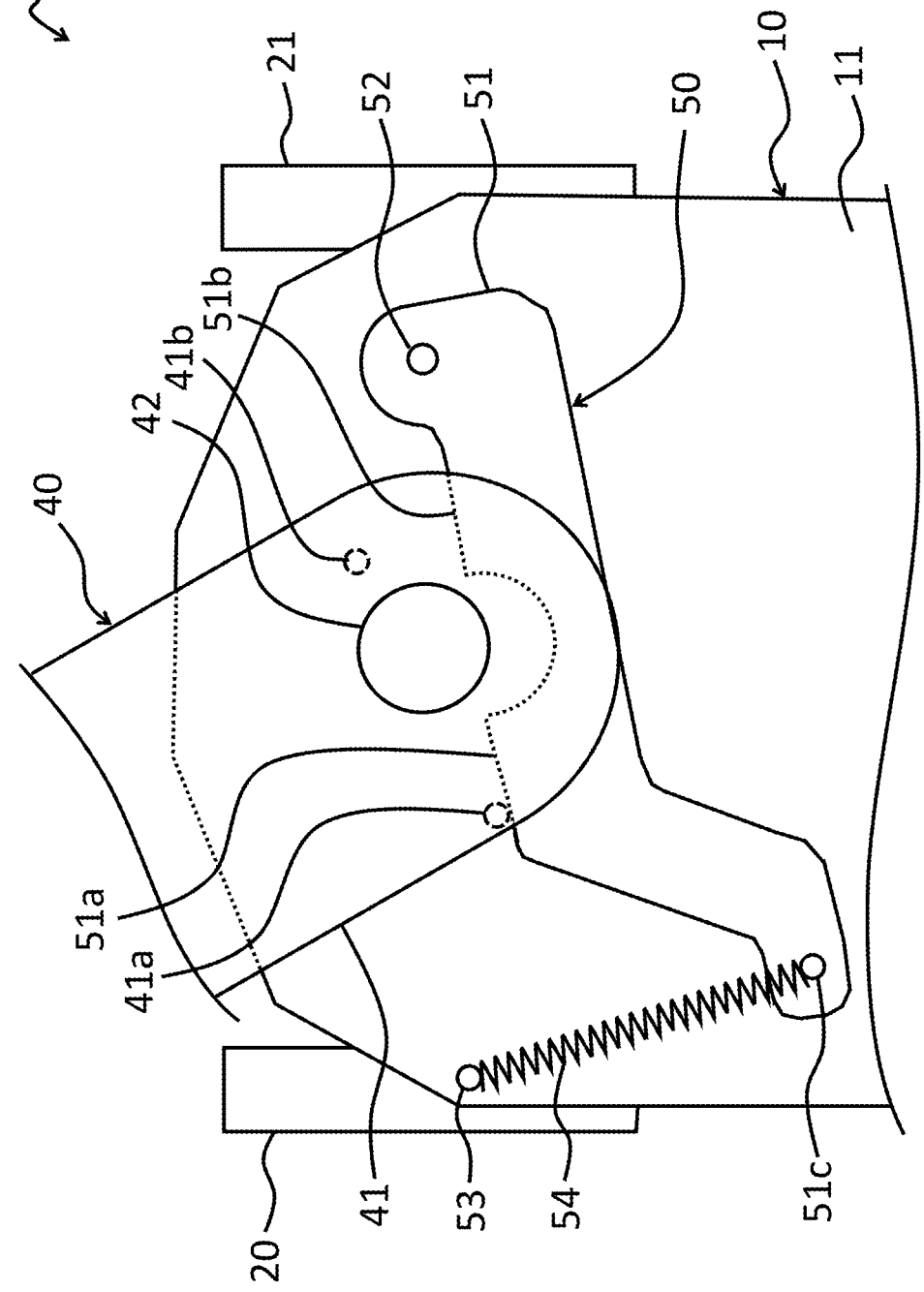
FIG. 7 is a schematic partial plan view when an arm of the rotation mechanism of the transport robot in the transport system according to the first exemplary embodiment is rotated in a first direction.
Figure 8:
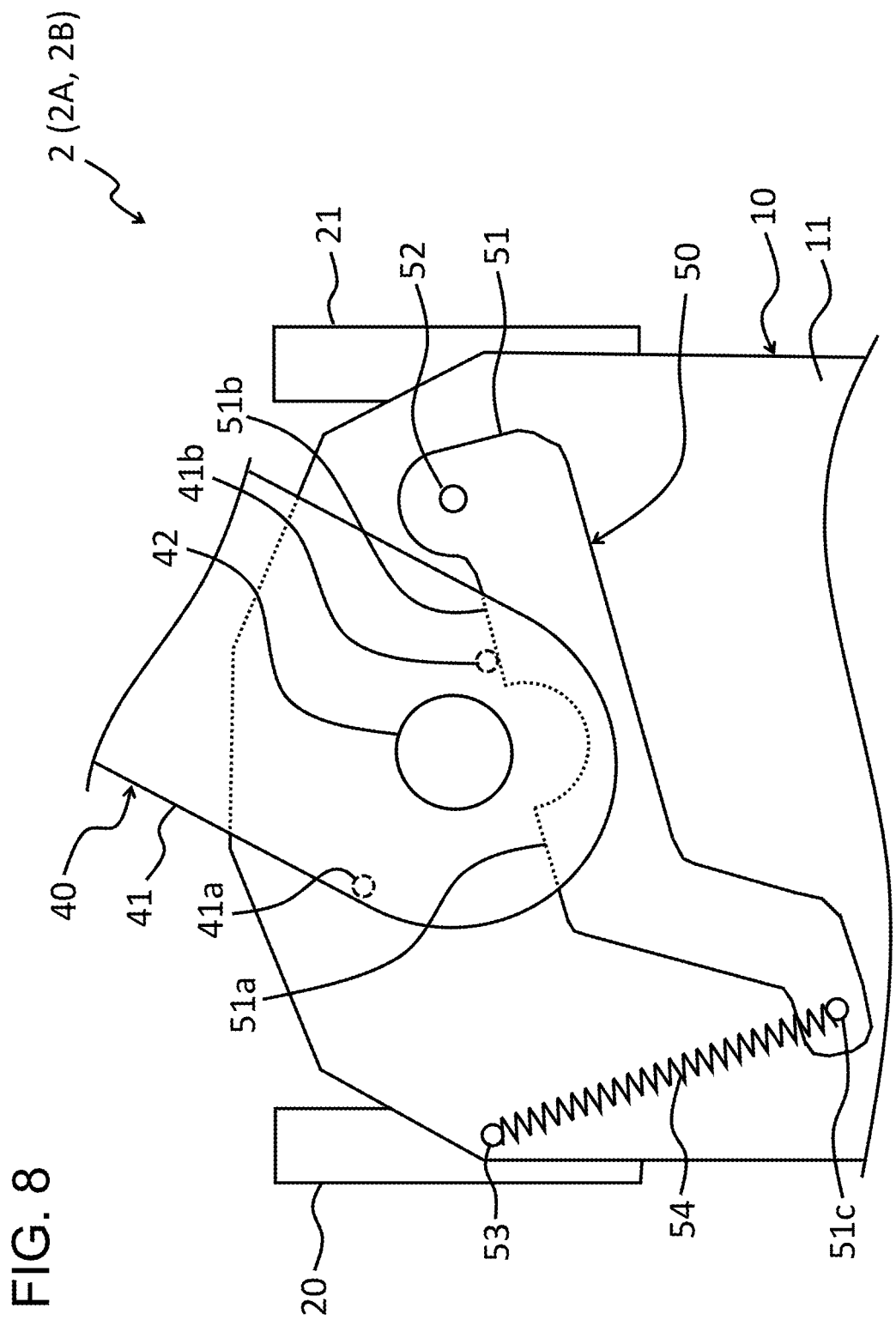
FIG. 8 is a schematic partial plan view when the arm of the rotation mechanism of the transport robot in the transport system according to the first exemplary embodiment is rotated in a second direction.
Figure 9:
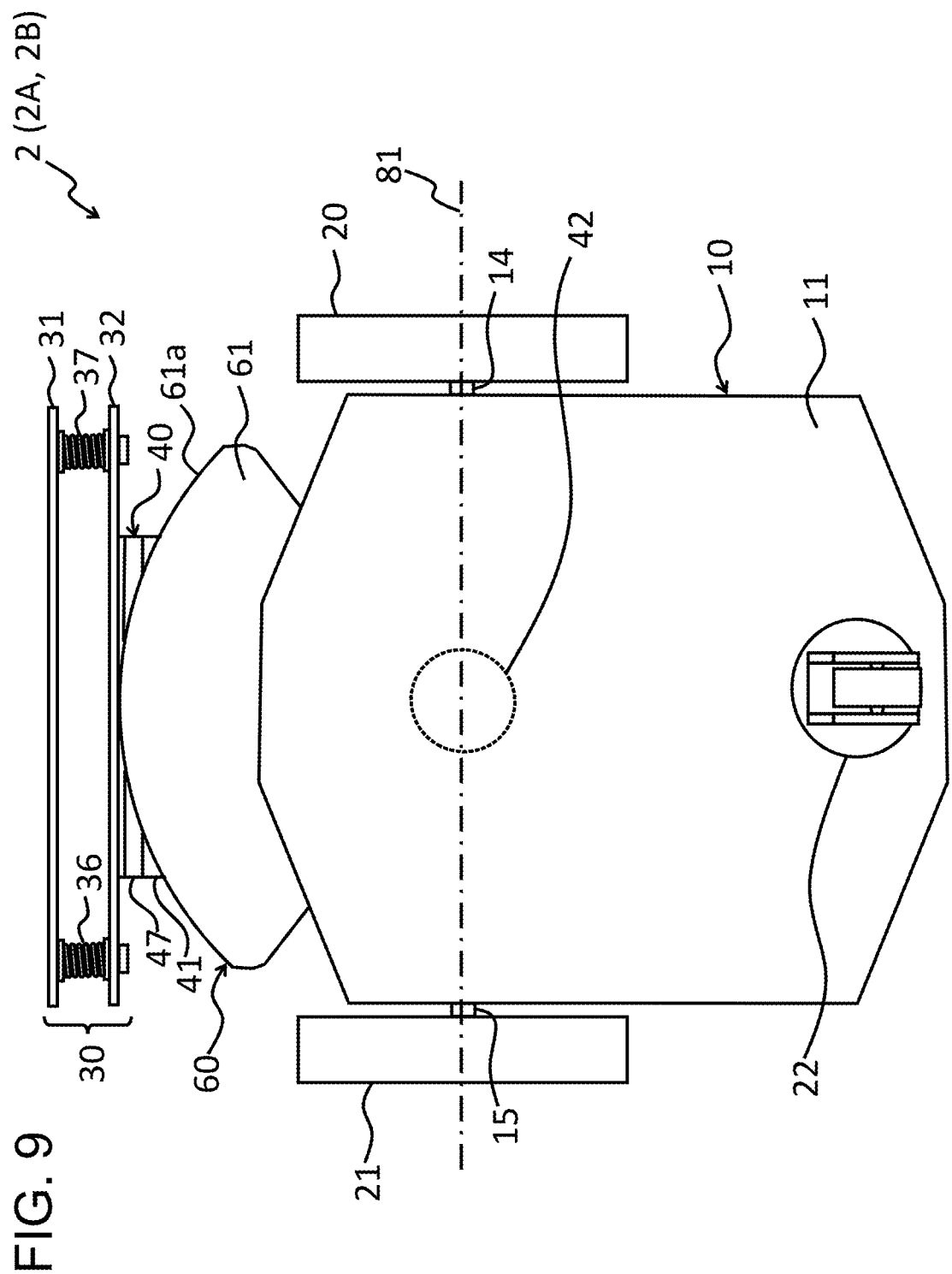
FIG. 9 is a schematic bottom view for explaining an operation of a guide mechanism of the transport robot in the transport system according to the first exemplary embodiment.
Figure 10:
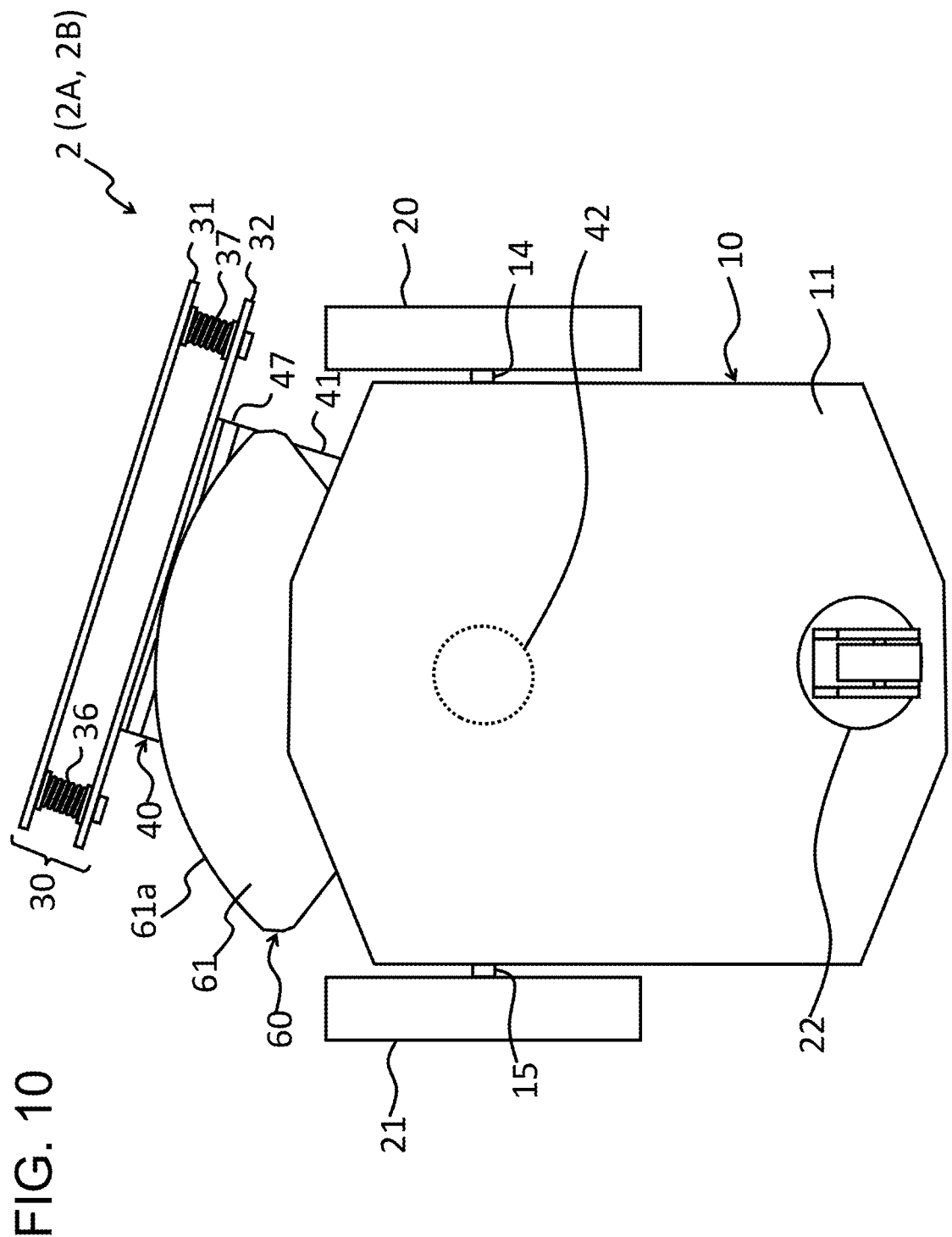
FIG. 10 is a schematic bottom view when the arm of the rotation mechanism of the transport robot in the transport system according to the first exemplary embodiment is rotated in the first direction.
Figure 11:
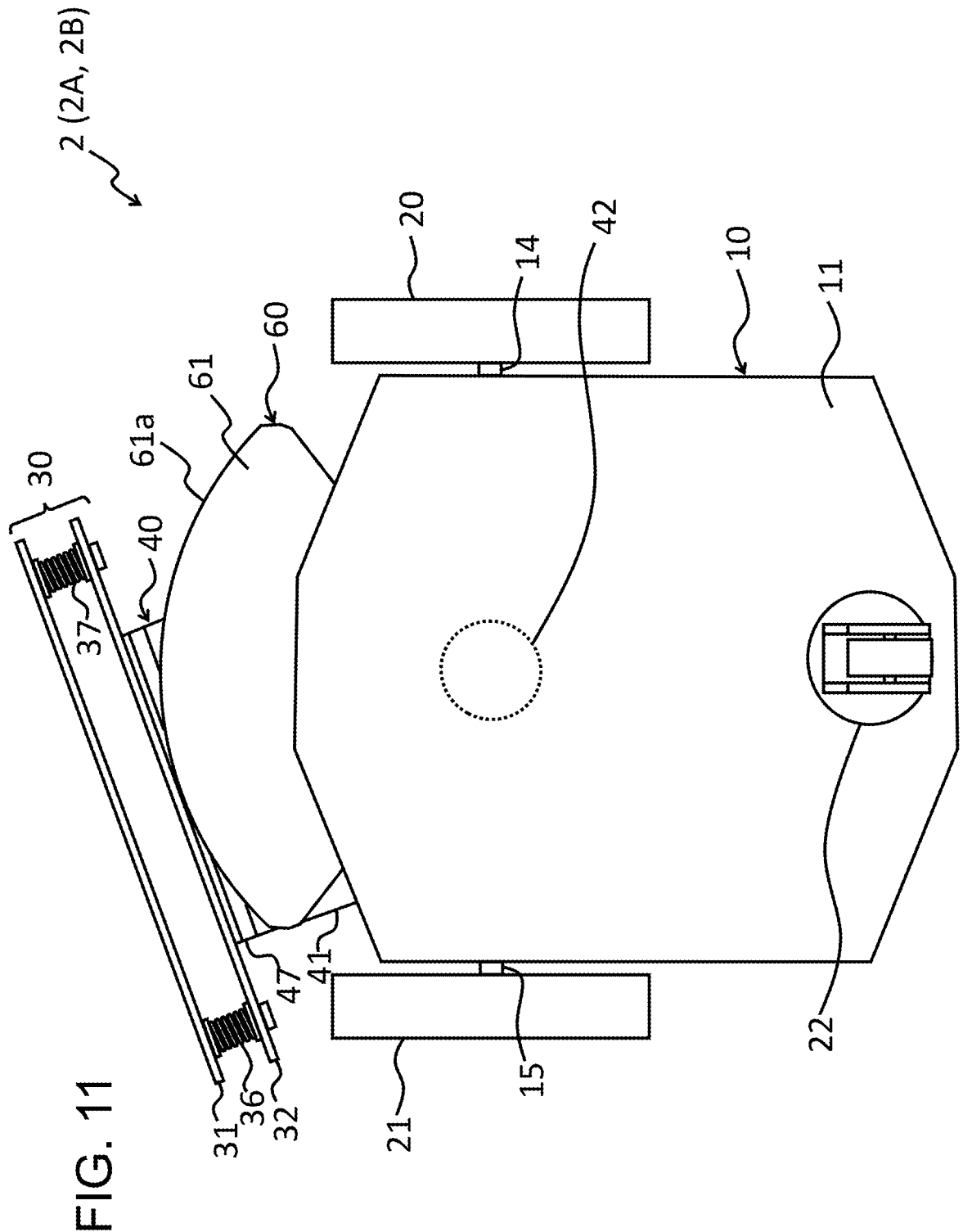
FIG. 11 is a schematic bottom view when the arm of the rotation mechanism of the transport robot in the transport system according to the first exemplary embodiment is rotated in the second direction.

A transport system according to a first exemplary embodiment will be described with reference to drawings. FIG. 1 is a plan view schematically showing an example of a state in which the transport system according to the first exemplary embodiment is transporting a transport object. FIG. 2 is a side view schematically showing the example of the state in which the transport system according to the first exemplary embodiment is transporting the transport object. FIG. 3 is an external perspective view schematically showing a configuration of a transport robot in the transport system according to the first exemplary embodiment. FIG. 4 is a block diagram schematically showing a circuit configuration of a main body of the transport robot in the transport system according to the first exemplary embodiment. FIG. 5 is a partial left side view for explaining an operation of a contact part of the transport robot in the transport system according to the first exemplary embodiment. FIG. 6 is a schematic partial plan view for explaining an operation of a rotation mechanism and a restoration mechanism of the transport robot in the transport system according to the first exemplary embodiment. FIG. 7 is a schematic partial plan view when an arm of the rotation mechanism of the transport robot in the transport system according to the first exemplary embodiment is rotated in a first direction. FIG. 8 is a schematic partial plan view when the arm of the rotation mechanism of the transport robot in the transport system according to the first exemplary embodiment is rotated in a second direction. FIG. 9 is a schematic bottom view for explaining an operation of a guide mechanism of the transport robot in the transport system according to the first exemplary embodiment. FIG. 10 is a schematic bottom view when the arm of the rotation mechanism of the transport robot in the transport system according to the first exemplary embodiment is rotated in the first direction. FIG. 11 is a schematic bottom view when the arm of the rotation mechanism of the transport robot in the transport system according to the first exemplary embodiment is rotated in the second direction.

The transport system 1 is a system comprising a plurality of transport robots 2A and 2B (two in FIG. 1; three or more are possible) (see FIGS. 1 and 2).

The transport robot 2 (for example, 2A in FIGS. 1 and 2) is a robot that is configured to transport the transport object (for example, in FIGS. 1 and 2) while sandwiching a transport object 5 by cooperating with another robot (for example, 2B in FIGS. 1 and 2) when transporting the transport object 5 (see FIGS. 1 to 4 and 6 to 11). The transport robot 2 (2A, 2B) comprises: a main body 10; wheels 20, 21; a contact part 30; a rotation mechanism 40; and a guide mechanism 60. The transport robot 2 (2A, 2B) may be configured to cooperate with each other by connecting them so as to be able to communicate (regardless wireless communication or wired communication) with each other.

The main body 10 is a unit (assembly) comprising basic component parts (11 to 17 in FIGS. 4 and 20 to 22 in FIG. 9) for functioning as the transport robot 2 (2A, 2B) (FIGS. 1 to 4, FIGS. 6 to 11). The main body 10 has a frame 11 and implements various component parts (12 to 17 in FIGS. 4 and 20 to 22 in FIG. 9) for functioning as a transport robot in the frame 11.

The frame 11 is a structure body for implementing various component parts (11 to 17 in FIGS. 4 and 20 to 22 in FIG. 9) for functioning as the transport robot 2 (2A, 2B) (see FIGS. 3, 4 and 6 to 11). The frame 11 may be, for example, a housing structure, a box-shaped structure, or the like. A pair of wheels 20 and 21 is rotatably attached to both left and right sides of the frame 11. A caster 22 is attached to a bottom surface of the frame 11.

The drive parts 12 and 13 are function parts that drive the wheels 20 and 21 (see FIG. 4). As the drive parts 12 and 13, for example, a drive unit comprising a motor, a speed reducer, a driver, various sensors (current sensor, torque sensor, position sensor, etc.), a regulator, and the like can be used. The drive parts 12 and 13 are mounted to the frame 11. A rotation power of the drive part 12 can be transmitted to the wheel 20 via a shaft 14. The rotation power of the drive part 13 can be transmitted to the wheels 21 via a shaft 15.

The shafts 14 and 15 are axial members that transmit the rotation power of the corresponding drive parts 12 and 13 to the wheels 20 and 21 (see FIGS. 3, 4, 9 to 11). The shaft 14 is connected to an output shaft (not shown) of the drive part 12 and extends on one side surface externally of the frame 11. The shaft 14 is attached to a shaft of the wheel 20 in outside of the frame 11. The shaft 15 is connected to an output shaft (not shown) of the drive part 13 and extends on another side surface externally of the frame 11. The shaft 15 is attached to a shaft of the wheel 21 in outside of the frame 11. The shafts 14 and 15 are arranged so as to be substantially coaxial with each other on the imaginary line (axis 81) shown by a dotted chain line in FIG. 9 (see FIG. 9). The shafts 14 and 15 may be arranged so that the wheels 20 and 21 are tilted (so as to have a camber angle), and may be designed so that the tilt of the wheels 20 and 21 is varied by using a suspension, a constant velocity joint or the like (so that the camber angle fluctuates).

The control part 16 is a function part that controls the pair of drive parts 12 and 13 by cooperating with another transport robot (2A or 2B) (see FIG. 4). As the control part 16, for example, a control unit (assembly or controller) comprising: a memory; a processor; and the like can be used. In this case, the control unit may be configured to execute control processings by executing a program in the processor while using the memory. The control part 16 can adjust moving speed, moving direction, and driving torque of the transport robot 2 (2A or 2B) by controlling the drive parts 12 and 13. The control part 16 may be mounted to the frame 11. The control part 16 is connected so that it can communicate (for example, communication using a wireless LAN (Local Area Network), infrared or Bluetooth (registered trademark)) with another transport robot (2A or 2B) or an external apparatus (not shown; for example, a tablet terminal, a mobile communication terminal, etc.) via the communication part 17. The control part 16 autonomously controls (locally controls) in response to a transport instruction.

The control part 16 controls (feedback-controls) the pair of drive parts 12 and 13 so that when (or during) the contact part 30 contacts the transport object 5, a load (i.e., pushing force) approaches a target value (first target value) based on information of a load acquired (received) from the load sensor 23. That is, in order to maintain a state in which the transport object 5 is sandwiched by a constant force, the control part 16 adjusts driving forces of the drive parts 12 and 13 using a load (distance between the plate members 31 and 32 is also possible) from the load sensor 23 as a guide value.

The control part 16 controls a follower transport robot 2B so as to follow the leader transport robot 2A while pushing the transport object 5 and a leader transport robot 2A so that the load approaches a target value based on information of a load acquired (received) from the load sensor 23, in case where the control part 16 is a control part mounted on the follower transport robot 2B. When the load is smaller than the target value (when a distance between the plate members 31 and 32 is too far), the control part 16 causes the follower transport robot 2B to accelerate. When the load is larger than the target value (when the distance between the plate members 31 and 32 is too close), the control part 16 causes the follower transport robot 2B to decelerate.

The control part 16 controls the leader transport robot 2A so as to proceed while receiving the transport object 5 pressed by the follower transport robot 2B so that the load (pushing force) approaches a target value based on information of a load acquired (received) from the load sensor 23, when the control part 16 is a control part mounted on the leader transport robot 2A. When the load is smaller than the target value (when a distance between the plate members 31 and 32 is too far), the control part 16 causes the leader transport robot 2A to decelerate. When the load is larger than the target value (when the distance between the plate members 31 and 32 is too close), the control part 16 causes the leader transport robot 2A to accelerate.

The control part 16 controls (feedback-controls) the pair of drive parts 12 and 13 such that a rotation angle of arms 41 and 43 of a rotation mechanism 40 approaches a target value (second target value) based on information of an angle acquired (received) from the angle sensor 24. In case where the control part 16 is a control part mounted on the follower transport robot 2B, the control part 16 sets a speed difference between the drive parts 12 and 13 of the follower transport robot 2B so as to follow a traveling direction of the leader transport robot 2A based on an angle from the angle sensor 24 as a guide value; and adjusts rotation speeds of the drive parts 12 and 13 so as to proceed in a direction in which the leader transport robot 2A is located. For example, when a rotation angle of the contact part 30 relative to the main body 10 of the follower transport robot 2B is on the right side (position of the leader transport robot 2A), a rotation speed of the drive part 12 for the left wheel 20 is accelerated and a rotation speed of the drive part 13 for the right wheel 21 is decelerated or maintained. Regarding the target value of a rotation angle of the arms 41 and 43 of the rotation mechanism 40, when the leader transport robot 2A runs straight, the follower transport robot 2B is set to 0 degrees so as to be positioned behind the leader transport robot 2A. When the leader transport robot 2A curves (runs along a curve), the follower transport robot 2B is set to an angle at which the follower transport robot 2B turns at a greater radius than the leader transport robot 2A. A target value of a rotation angle of the arms 41 and 43 of the rotation mechanism 40 at the time of curving can be determined in advance from a size of the transport object 5 (distance between the transport robots 2A and 2B) and s traveling course (radius of a curve).

The communication part 17 is a function part that enables communication with another transport robot (2A or 2B) (see FIG. 4). The communication part 17 may have a configuration capable of communicating with an external apparatus (not shown; for example, a tablet terminal, a mobile communication terminal, etc.).

The wheels 20 and 21 are drive wheels that realize movement of the transport robot 2 (2A, 2B) (see FIGS. 1 to 4 and 6 to 11). The wheel 20 is fixed to the shaft 14 at an axial center of the wheel 20. The wheel 21 is fixed to the shaft 15 at an axial center of the wheel 21. The wheels 20 and 21 may be arranged so as to be substantially coaxial with each other on a virtual line (axis 81 in FIGS. 6 and 9). The wheels 20 and 21 may be arranged so as to be tilted (to have a camber angle), and may be designed so that the tilt varies (so that a camber angle fluctuates) by using a suspension, a constant velocity joint, or the like.

A caster 22 is a non-driving wheel that functions as an auxiliary wheel for the wheels 20 and 21 (see FIGS. 1, 2, 9 to 11). The caster 22 is configured to be rotatable so that a traveling direction can be changed.

The load sensor 23 is a sensor that detects a load (pressure or pushing force, distance between plates) applied to a contact part 30 when the contact part 30 contacts the transport object 5 while the transport object 5 is sandwiched between the plurality of transport robots 2 (2A, 2B) (see FIG. 4). As the load sensor 23, a distance sensor that detects a load applied to the contact part 30 based on a distance between the plate members 31 and 32 sandwiching elastic members 34 to 37 in the contact part 30 can be used. The load sensor 23 is not limited to this, and a piezoelectric element (piezo element), a strain gauge, or the like can also be used. Information of a load detected by the load sensor 23 is transmitted to the control part 16.

The angle sensor 24 is a sensor that detects a rotation angle (corresponding to a rotation angle of the contact part 30) of the arms 41 and 43 of the rotation mechanism 40 relative to the main body 10 (see FIG. 4). As the angle sensor 24, for example, a position encoder for angle measurement and a position angle sensor (magnetic type, resolver type, contact type) connected to a part (a portion interlocking with the rotation of the arm 41) of a shaft part 42 which is a rotation portion of rotation mechanism 40, or the like can be used. Information of an angle detected by the angle sensor 24 is transmitted to the control part 16.

A contact part 30 is a portion that contacts the transport object 5 (see FIGS. 1 to 3, 5 and 9 to 11). The contact part 30 is fixed to one end part of the arms 41 and 43 of the rotation mechanism 40. The arms 41 and 43 are rotatably supported by the main body 10 at a shaft part 42 provided near the other end part of the arms 41 and 43. As a result, the contact part 30 can rotate together with the arm 41 of the rotation mechanism 40 around the shaft part 42 extending in a direction perpendicular relative to a paper surface of FIG. 6, as shown in FIGS. 7 and 8. The rotation direction of the contact part 30 may include at least a longitude direction (for example, a horizontal direction and a left-and-right direction) relative to the main body 10 and may include a latitude direction (for example, a vertical direction and an up-and-down direction). In case where the contact part 30 is the contact part 30 of the follower transport robot 2B during transportation, the contact part 30 becomes a portion of pressing (pushing) the transport object 5, and similarly in case where the contact part 30 is the contact part 30 of the leader transport robot 2A during transportation, the contact part 30 becomes a portion of receiving the transport object 5. Although a width of the contact part 30 is smaller than a width of the transport object 5 in FIG. 1, the width of the contact part may be larger than the width of the transport object 5.

The contact part 30 is configured so that a contact load between the contact part 30 and the transport object 5 can be detected by the load sensor 23 (see FIGS. 1 to 4). The contact part 30 of FIG. 3 is configured so that a contact load when the contact part 30 contacts the transport object 5 can be detected by detecting a distance between the plate members 31 and 32. The load sensor 23 (distance sensor) of FIG. 4 can be used as a means that detects the contact load. The contact part 30 comprises: plate members 31 and 32; a friction part 33; and elastic members 34 to 37.

The plate member 31 is supported by the plate member 32 via the elastic members 34 to 37 (see FIGS. 3, 5, 9 to 11). The plate member 31 has the friction part 33 on a surface that contacts the transport object 5.

The plate member 32 supports the plate member 31 via elastic members 34 to 37 (see FIGS. 3, 5, 9 to 11). The plate member 32 is attached to the arm 43 by stays 44 and 45, and is attached to the arm 41 by stays 46 and 47. The plate member 32 slidably contacts a guide surface 61a of a guide member 61 in a guide mechanism 60, and supports the pressing of the contact part 30 against the transport object 5 by the guide mechanism 60.

The friction part 33 increases a frictional force generated between the friction part 33 and the transport object 5 when the friction part 33 contacts the transport object 5 (see FIGS. 3 and 5). As a result, the friction part 33 prevents or suppresses that the transport object 5 relatively sideslips when the rotation mechanism 40 rotates in contact with the friction part 33. As the friction part 33, for example, a material having a higher coefficient of friction than a material used for the plate member 31, or an elastic material having a restoring force (for example, rubber) can be used.

The elastic members 34 to 37 are interposed between the plate members 31 and 32 (see FIGS. 3 and 5). The elastic members 34 to 37 act to return to an original uncompressed state (so that the distance between the plate members 31 and 32 is widened) when a space between the plate members 31 and 32 is narrowed and compressed and deformed. As the elastic members 34 to 37, for example, coil springs guided in an expansion-and-contraction direction can be used. A spring coefficient(s) of the elastic members 34 to 37 can be used to calculate a load detected by the load sensor 23.

The rotation mechanism 40 is a mechanism that makes the contact part 30 rotatable relative to the main body 10 (see FIGS. 1 to 3 and 5 to 11). A rotatable angle of the rotation mechanism 40 is not particularly limited, but can be 45° to left or right. The rotation mechanism 40 comprises; a shaft part 42; and arms 41 and 43.

The shaft part 42 is attached to an upper surface of the frame 11 of the main body 10. A central axis of the shaft part 42 is preferably designed so as to pass through a midpoint of width W between the wheels 20 and 21 (see FIG. 6), but is not limited to this design. The shaft part 42 has: one portion fixed to the frame 11; and another portion rotatably attached to the one portion in the longitude direction (for example, horizontal direction, left-and-right direction), and the arms 41 and 43 are fixed to the other portion.

The arms 41 and 43 are set so that the contact part 30 does not interfere with the main body 10 and the wheels 20 and 21 when the contact part 30 is rotated. The plate member 31 of the contact part 30 is attached to the arm 43 by the stays 44 and 45. The plate member 31 of the contact part 30 is attached to the arm 41 by the stays 46 and 47. The arm 41 and the arm 43 are arranged at a predetermined interval. Although there are two arms 41 and 43 in FIG. 3, the number of arm may be one or three or more.

Pin parts 41a and 41b are fixed to the arm 41 at positions radially apart from the shaft part 42. The pin parts 41a and 41b function as cams of a restoration mechanism 50. The pin parts 41a and 41b are arranged apart from each other. The pin part 41a contacts a receiving surface 51a of a swing member 51 in the restoration mechanism 50 so as to be able to contact/separate and slide. The pin part 41b contacts a receiving surface 51b of the swing member 51 in the restoring mechanism 50 so as to be able to contact/separate and slide.

The rotation mechanism 40 comprises the restoration mechanism 50 that restores so as to return the contact part 30 in a state of being rotated (for example, the states of FIGS. 7 and 8) from a predetermined position (for example, a center point in a rotation direction: front surface, origin, state of FIG. 6) to the predetermined position.

The restoration mechanism 50 is a mechanism that acts on the rotation mechanism 40 so as to restore the contact part 30 in a state of being rotated from a predetermined position to the predetermined position (see FIGS. 3, 6 to 8). The restoration mechanism 50 comprises: a swing member 51; a shaft part 52; a pin part 53; and an elastic member 54.

The swing member 51 is a member that can swing (rotate) around the shaft part 52 attached to the frame 11 of the main body 10. The swing member 51 comprises: receiving surfaces 51a and 51b; and a pin part 51c. The receiving surface 51a is a surface that contacts the pin part 41a of the arm 41 in the rotation mechanism 40 so as to be able to contact/separate and slide. The receiving surface 51b is a surface that contacts the pin part 41b of the arm 41 in the rotation mechanism 40 so as to be able to contact/separate and slide. The pin part 51c is fixed at a predetermined position of the swing member 51 apart from the shaft part 52 so as not to interfere with the arm 41. The pin part 51c is connected to one end of the elastic member 54 and is set so as to be attracted toward the pin part 53 connected to the other end of the elastic member 54.

The shaft part 52 is attached to the frame 11 of the main body 10 at a position apart from the shaft part 42. The swing member 51 is swingably (rotatably) attached to the shaft part 52.

The pin part 53 is attached to the frame 11 of the main body 10 at a position away from the shaft part 52 so as not to interfere with the arm 41. The pin part 53 is connected to the other end of the elastic member 54, and is set to attract the pin part 51c connected to one end of the elastic member 54.

The elastic member 54 is a member that acts to attract the pin part 51c of the swing member 51 toward the pin part 53 by an elastic force when extended. The pin part 51c of the swing member 51 is attached to one end of the elastic member 54, and a pin part 53 is attached to the other end of the elastic member 54. As the elastic member 54, for example, a coil spring, a torsion spring, or the like can be used.

In the restoration mechanism 50, when changing from a state of FIG. 6 to a state of FIG. 7, that is, when the arm 41 in the rotation mechanism 40 rotates from a predetermined position (center position) to left about the shaft part 42, the pin part 41a of the arm 41 presses the receiving surface 51a of the swing member 51 (and the pin part 41b is separated from the receiving surface 51b); the swing member 51 rotates about the shaft part 52 so that the distance between the pin part 51c of the swing member 51 and the pin part 53 becomes large; the elastic member 54 between the pin parts 51c and 53 extends, which urges the arm 41 to return to the predetermined position (center position).

Also, in the restoration mechanism 50, when changing from a state of FIG. 6 to a state of FIG. 8, that is, when the arm 41 in the rotation mechanism 40 rotates from the predetermined position (center position) to right about the shaft part 42, the pin part 41b of the arm 41 presses the receiving surface 51b of the swing member 51 (and the pin part 41a is separated from the receiving surface 51a); the swing member 51 rotates about the shaft part 52 so that a distance between the pin parts 51c and 53 of the swing member 51 becomes large; the elastic member 54 between the pin parts 51c and 53 extends, which urges the arm 41 to return to the predetermined position (center position).

The rotation mechanism 40 may be configured to have a damping mechanism (not shown) that damps a vibration generated at the elastic member 54 in the restoring mechanism 50. The damping mechanism can damp a vibration generated at the elastic member 54 in the restoration mechanism 50 by friction, viscosity, or hysteresis.

A guide mechanism 60 is a mechanism that guides rotation of the contact part 30 relative to the main body 10 (see FIGS. 1 to 3, 5 and 9 to 11). The guide mechanism 60 supports pressing the contact part 30 against the transport object 5. The guide mechanism 60 comprises a guide member 61 attached to the frame 11 in the main body 10. The guide member 61 comprises a guide surface 61a formed along an orbit of the contact part 30 when the contact part 30 is rotated. The guide surface 61a slidably contacts the plate member 32 in the contact part 30.

As the transport object 5, a cart, a dolly, or the like having a plurality of pivotable casters 71 to 74 (wheels) in a pedestal 70 on which a freight 6 is placed can be used. The transport object 5 may be one that does not have wheels such as casters (for example, cardboard box).

The plurality of transport robots 2 in the transport system 1 as described above have a role of either the leader transport robot 2A or the follower transport robot 2B.

The leader transport robot 2A calculates a speed based on a current location and a destination according to instructions (destination, speed input) from, for example, an external apparatus (not shown; for example, a tablet terminal, a mobile communication terminal, etc.), and then move toward (destined to) the destination. For example, the leader transport robot 2A follows an orbit (straight line, curve (parabola, spline curve, clothoid curve, etc.), arc) connecting the current location and the destination to move. The current location hereof is a current location of the leader transport robot 2A itself; may be acquired from the outside through the communication part 17; may be calculated and acquired by itself based on encoder values and control history of the drive parts 12 and 13. and may be acquired from a position detection part (not shown; for example, a GPS (Global Positioning System) receiver, a beacon receiver, etc.) comprised in the leader transport robot 2A. The leader transport robot 2A measures a distance "d" between the plate members 31 and 32 by the load sensor 23 (here, distance sensor), and controls (feedback-controls) the own drive parts 12 and 13 so as to keep a distance d constant (so that a load approaches a first target value). Also, the leader transport robot 2A measures a rotation angle θ of the arms 41 and 43 of the rotation mechanism 40 by the angle sensor 24 (here, encoder), and controls (feedback-controls) the own drive parts 12 and 13 so as to adjust the rotation angle θ to a target value (so that a rotation angle approaches a second target value). The feedback-control by the load sensor 23 and the angle sensor 24 in the leader transport robot 2A may be omitted, and the feedback-control by the load sensor 23 and the angle sensor 24 may be performed in the follower transport robot 2B only. Further, the feedback-control can be, for example, a PID (Proportional Integral Differential) control in which the input value is controlled by three elements of: deviation between the output value and the target value; integral thereof; and differential thereof.

The follower transport robot 2B follows the leader transport robot 2A so as to press (push) the transport object 5 against the leader transport robot 2A with a load (pushing force) of a target value determined according to the weight of the transport object 5. When the pressing load (force) deviates from the target value, the follower transport robot 2B moves so as to approach the target value. The follower transport robot 2B measures a distance d between the plate members 31 and 32 by the load sensor 23 (here, distance sensor), and controls (feedback-controls) the own drive parts 12 and 13 so as to keep the distance d constant. Also, the follower transport robot 2B measures a rotation angle θ of the arms 41 and 43 of the rotation mechanism 40 by the angle sensor 24 (here, encoder), and controls (feedback-controls) the own drive parts 12 and 13 so as to match (i.e., approach) the rotation angle θ to the target value.

Regarding a traveling speed of the transport robot 2, assuming that the current traveling speed is $v_{base}$, the speeds $v_r$ and $v_l$ according to control signals input to the drive parts 12 and 13 of the left and right wheels 20 and 21 can be expressed, for example, as the following Formula 1.

$$v_r = v_{base} + v_\beta + v_\gamma \qquad \text{[Formula 1]}$$

$$v_l = v_{base} + v_\beta - v_\gamma \qquad \text{[Formula 1]}$$

Here, $v_{base}$ of Formula 1 is set in advance in consideration of the surrounding environment, safety, etc., and the same value as (corresponding to the value) a moving speed (moving speed of center of gravity, average of rotation speeds of left and right wheels) of the leader transport robot 2A is set as $v_{base}$.

The $v_\beta$ of Formula 1 is a speed corresponding to a load (in the case of the distance sensor, distance d between the plate members 31 and 32) detected by the load sensor 23, and can be expressed, for example, as the following Formula 2.

$$v_\beta = k_a \Delta d + k_b \int_0^T \Delta d\, dt + k_c \frac{d\Delta d}{dt} \qquad \text{[Formula 2]}$$

$$\Delta d = d_{target} - d$$

For example, when a load (pushing force) becomes small (when a distance d between the plate members 31 and 32 is long (Δd<0)), $v_\beta$ of Formula 2 is accelerated (increased), and when a load becomes small [sic. large] (when a distance d between the plate members 31 and 32 is short (Δd>0)), $v_\beta$ is decelerated (decreased). $v_\beta$ can be increased when a load is large and decreased when a load is small, depending on a slope and conditions (unevenness, etc.) of a road surface. In Formula 2, T is a time of control loop, $k_a$, $k_b$ and $k_c$ are gain coefficients, and $d_{target}$ is a target value of a distance between the plate members 31 and 32. $d_{target}$ is set in advance.

The $v_\gamma$ of Formula 1 is a speed corresponding to a rotation angle θ of the arms 41 and 43 of the rotation mechanism 40, and can be expressed, for example, as the following Formula 3.

$$v_\gamma = k_d \Delta\theta + k_e \int_0^T \Delta\theta\, dt + k_f \frac{d\Delta\theta}{dt} \qquad \text{[Formula 3]}$$

$$\Delta\theta = \theta_{target} - \theta$$

A value of $v_\gamma$ of Formula 3 determines the curvature during transportation. In other words, as $v_\gamma$ becomes large, the curve will be steep (sharp) [curvature increases]. In Formula 3, T is a time of one cycle of a control loop; $k_d$, $k_e$ and kf are gain coefficients; and $\theta_{target}$ is a target value of a rotation angle of the arms 41 and 43 of the rotation mechanism 40. $\theta_{target}$ is set in advance.

Figure 12:
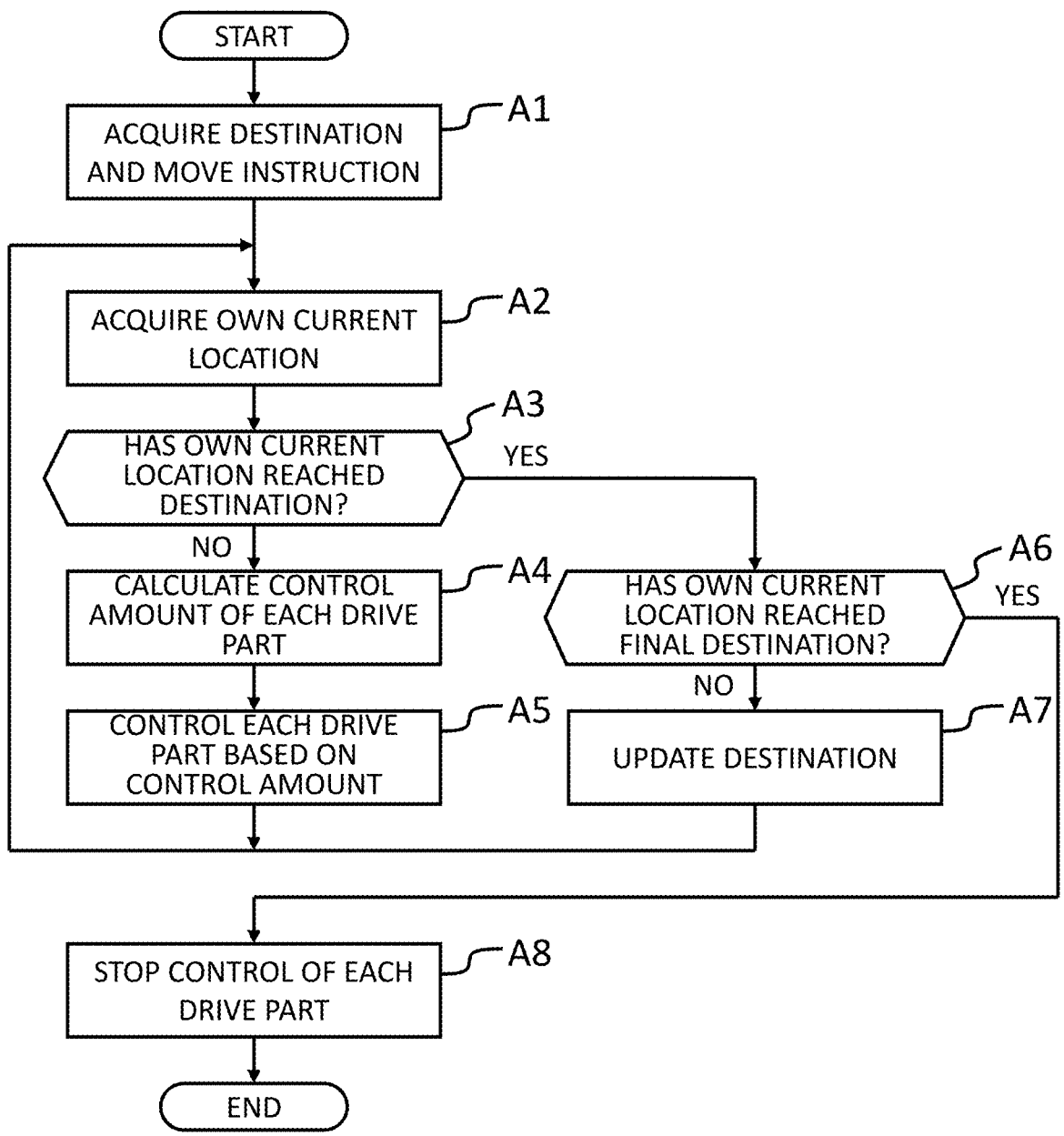
FIG. 12 is a flowchart schematically showing an operation when the transport robot in the transport system according to the first exemplary embodiment moves alone.
Figure 13:
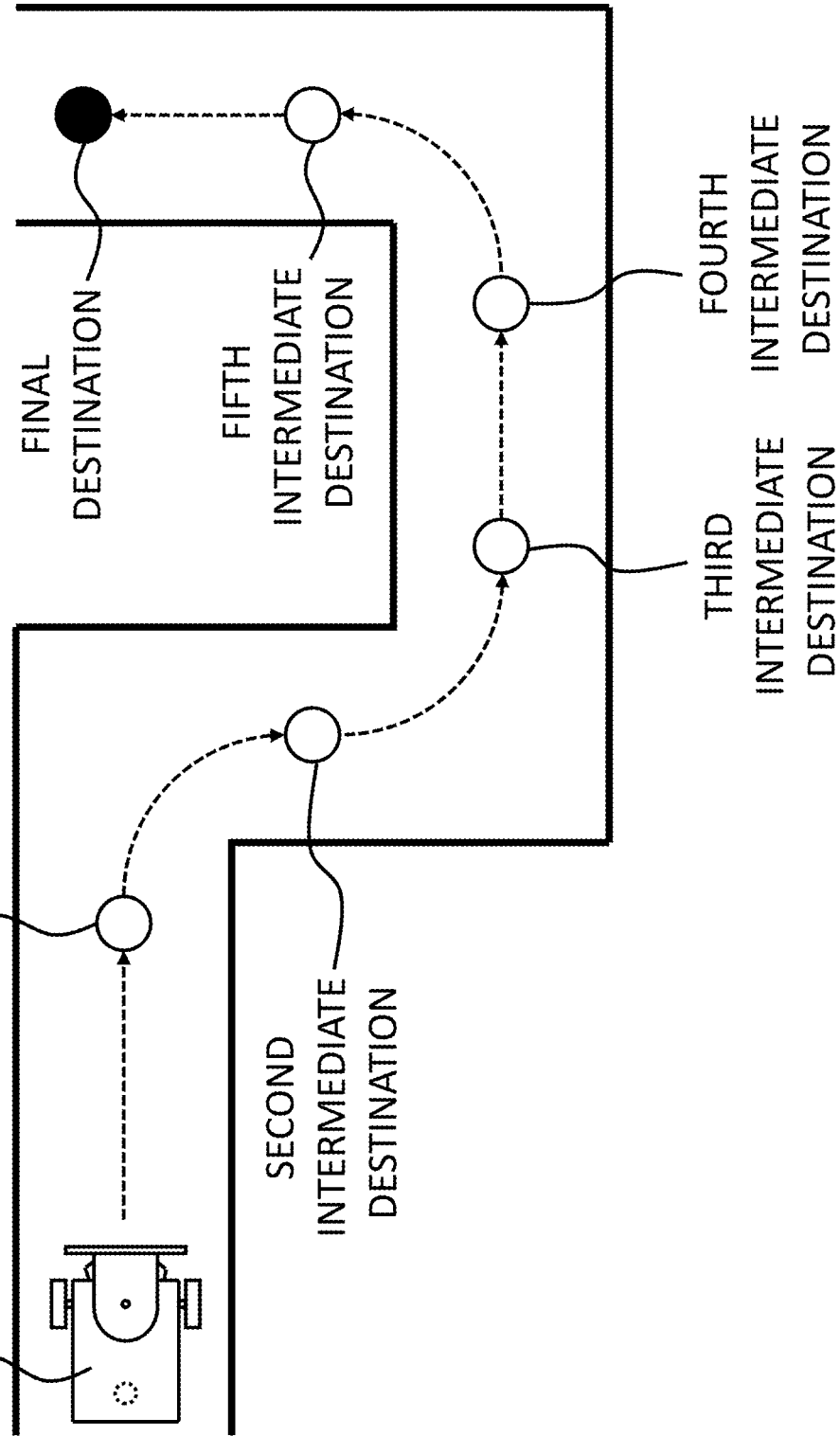
FIG. 13 is an image diagram of an intermediate destination and a final destination when the transport robot in the transport system according to the first exemplary embodiment moves alone.

Next, an operation when the transport robot in the transport system according to the first exemplary embodiment moves alone will be described with reference to the drawings. FIG. 12 is a flowchart schematically showing an operation when the transport robot in the transport system according to the first exemplary embodiment moves alone. FIG. 13 is an image diagram of intermediate destinations and a final destination when the transport robot in the transport system according to the first exemplary embodiment moves alone. As to configuration parts in the transport system, please refer to FIGS. 1 to 11.

First, the control part 16 of the transport robot 2 acquires information of a destination (including an intermediate destination(s) and a final destination; see FIG. 13), and a movement instruction from an outside (not shown; for example, a network to which an information communication terminal capable of near field communication and an information processing apparatus are connected) through the communication part 17 (Step A1).

After Step A1, the control part 16 of the transport robot 2 starts a control loop of the drive parts 12 and 13 in a predetermined time (for example, several tens of ms (milliseconds)) (Steps A2 to A7).

After Step A1; after Step A5; or after Step A7, in the control loop, the control part 16 of the transport robot 2 acquires information (for example, position coordinates) of an own (hereinafter, may be abbreviated as "own") current location of the transport robot 2 (Step A2). Here, the own current location may be acquired from the outside through the communication part 17; may be calculated and acquired by oneself based on encoder values or control history of the drive parts 12 and 13; or may be acquired from a position detection part (not shown; for example, a GPS (Global Positioning System) receiver, a beacon receiver, etc.). comprised in the transport robot 2.

Next, in the control loop, the control part 16 of the transport robot 2 determines whether or not the acquired own current location has reached the acquired destination (a nearest destination in front) (for example, whether or not it is within a predetermined radius of the destination) (Step A3). When the destination has been reached (YES in Step A3), the process proceeds to Step A6.

When the destination has not been reached (NO in Step A3), in the control loop, the control part 16 of the transport robot 2 calculates control amounts of own drive parts 12 and 13 (for example, rotation speeds of the wheels 20 and 21) (Step A4).

Next, in the control loop, the control part 16 of the transport robot 2 controls the own drive parts 12 and 13 based on the calculated control amount (Step A5), and then returns to Step A2.

When the destination has been reached (YES in Step A3), in the control loop, the control part 16 of the transport robot 2 determines whether or not the current location has reached the final destination (for example, whether or not it is within a predetermined radius of the final destination) (Step A6). When the final destination has been reached (YES in Step A6), the process proceeds to Step A8.

When the final destination has not been reached (NO in Step A6), in the control loop, the control part 16 of the transport robot 2 updates the destination to a nearest destination in front (Step A7), and then returns to Step A2.

When the final destination has been reached (YES in Step A6), the control part 16 of the transport robot 2 goes out of the control loop to stop the control of the own drive parts 12 and 13 (Step A8), and then ends.

Although FIG. 12 shows an operation when the transport robot 2 moves alone, an operation of the leader transport robot 2A when the transport system performs cooperative transportation can be the same as that in FIG. 12.

Figure 14:
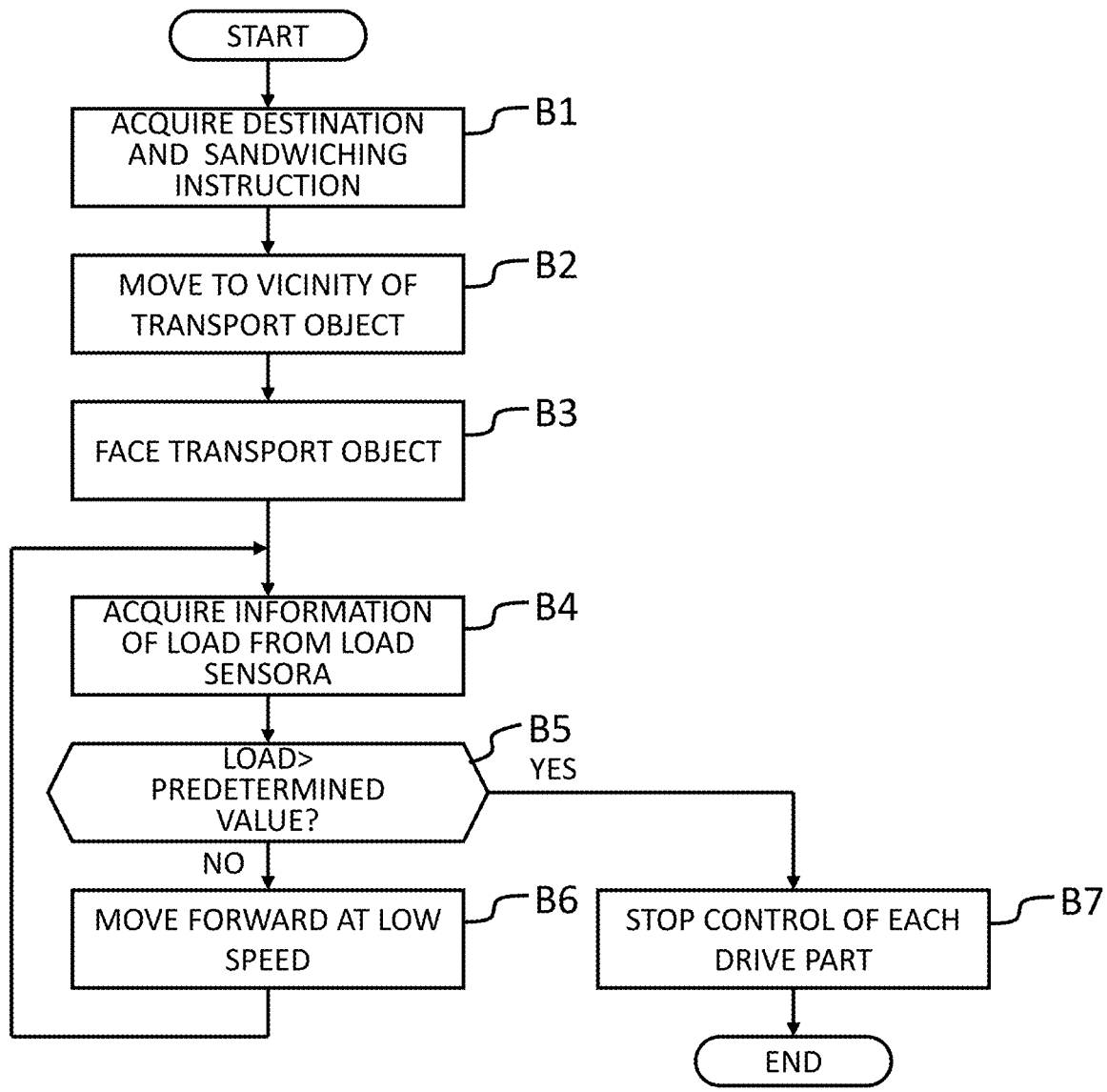
FIG. 14 is a flowchart schematically showing an operation of the transport robots when the transport system according to the first exemplary embodiment sandwiches a transport object.
Figure 15A:
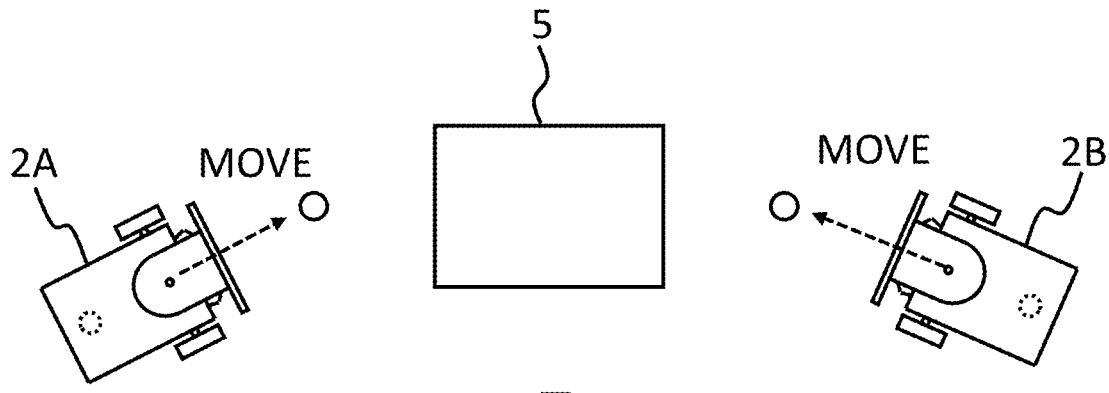
FIGS. 15A-15C are image diagrams of an operation of the transport robots when the transport system according to the first exemplary embodiment sandwiches a transport object.
Figure 15B:
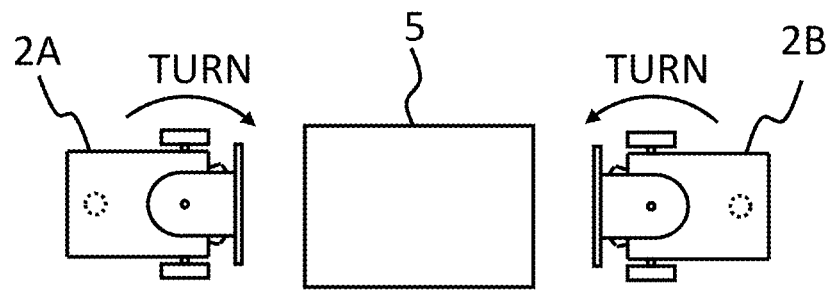
Figure 15C:
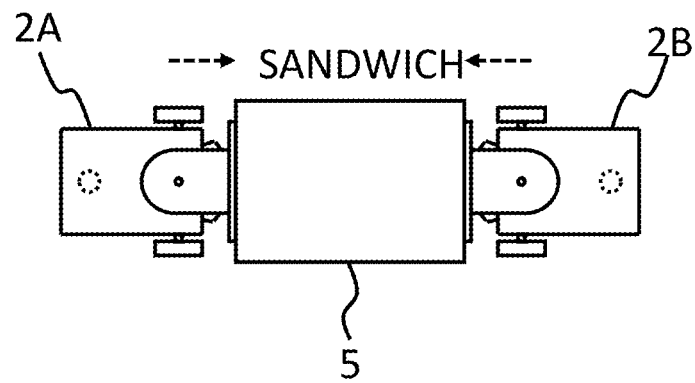

Next, an operation of the transport robots when the transport system according to the first exemplary embodiment sandwiches the transport object will be described with reference to the drawings. FIG. 14 is a flowchart schematically showing an operation of the transport robots when the transport system according to the first exemplary embodiment sandwiches the transport object. FIGS. 15A-15C are image diagrams of the operation of the transport robots when the transport system according to the first exemplary embodiment sandwiches the transport object.

First, the control parts 16 of the transport robots 2A and 2B acquire information of a destination, and an instruction for sandwiching the transport object 5 from outside (not shown; for example, an information communication terminal capable of near field communication, a network to which an information processing apparatus is connected) through the communication part 17 (Step B1).

Next, the control parts 16 of the transport robots 2A and 2B control the drive parts 12 and 13 so that the transport robots 2A and 2B move to a vicinity of the transport object 5 (Step B2; see FIG. 15A).

Next, the control parts 16 of the transport robots 2A and 2B control the drive parts 12 and 13 so that the transport robots 2A and 2B face the transport object 5 (so that the transport robots 2A and 2B rotate and the front surfaces of the transport robots 2A and 2B face the transport object 5) (Step B3; see FIG. 15B).

After Step B3, the control parts 16 of the transport robots 2A and 2B start a control loop of the drive parts 12 and 13 in a predetermined time (for example, tens of ms) (Steps B4 to B6).

After Step B3 or after Step B6, in the control loop, the control parts 16 of the transport robots 2A and 2B acquire information (in the case of a distance sensor, information of the distance d between the plate members 31 and 32 is also possible) of a load (pushing force) from the load sensor 23 (Step B4).

Next, the control parts 16 of the transport robots 2A and 2B determine whether or not the acquired load is larger than a predetermined value (in the case of a distance d, whether or not d is less than a predetermined value) (Step B5). When the load is greater than the predetermined value (YES in Step B5), the process proceeds to Step B7.

When the load is the predetermined value or less (NO in Step B5), the control parts 16 of the transport robots 2A and 2B control the drive parts 12 and 13 so that the transport robots 2A and 2B move forward at a low speed (Step B6; see FIG. 15C), and then return to Step B4.

When the load is larger than the predetermined value (YES in Step B5), the control parts 16 of the transport robots 2A and 2B go out of the control loop to stop the controls of the drive parts 12 and 13 (Step B7), and then end.

Figure 16:
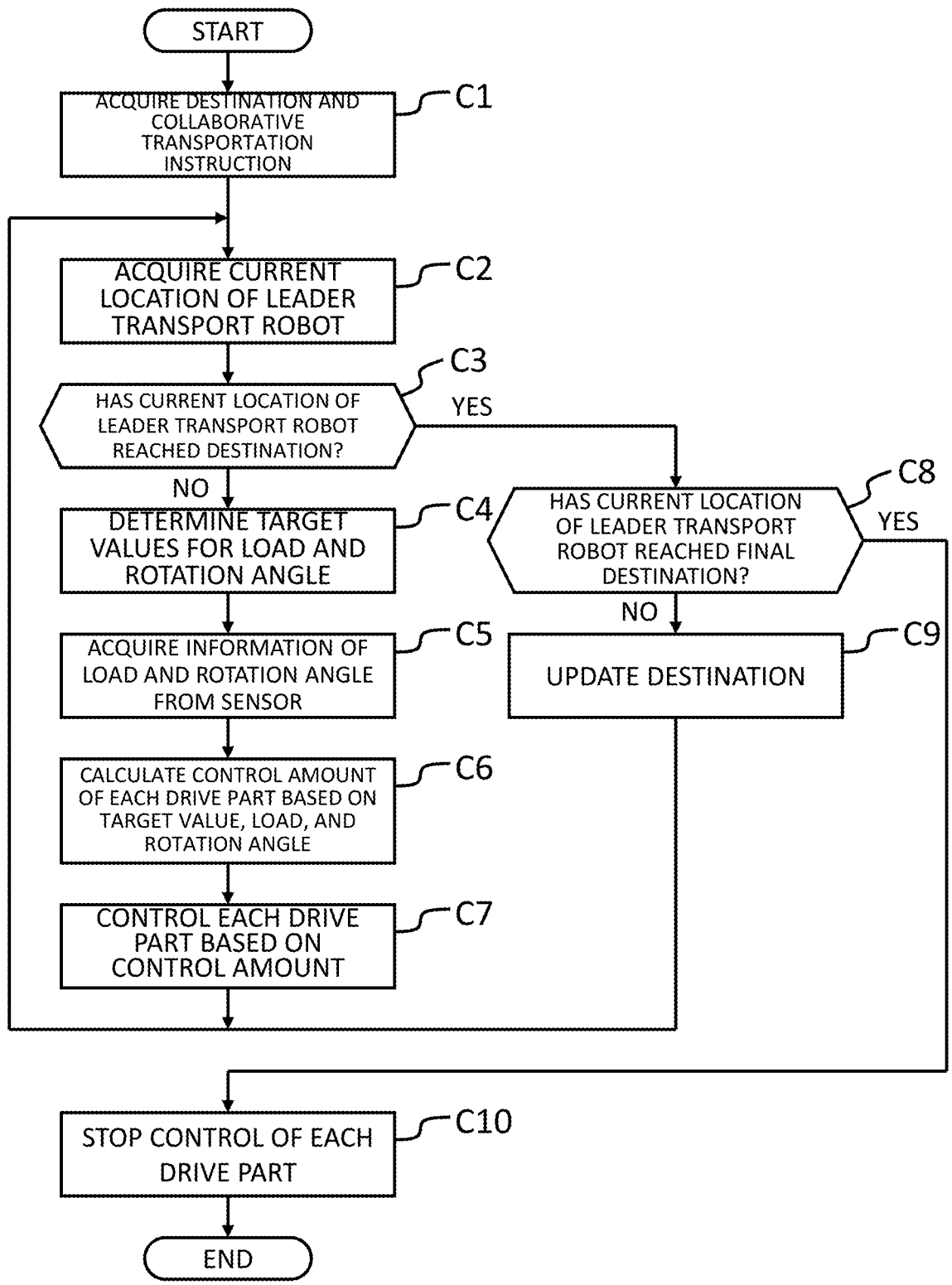
FIG. 16 is a flowchart schematically showing an operation of a follower transport robot when the transport system according to the first exemplary embodiment collaboratively transports a transport object.
Figure 17:
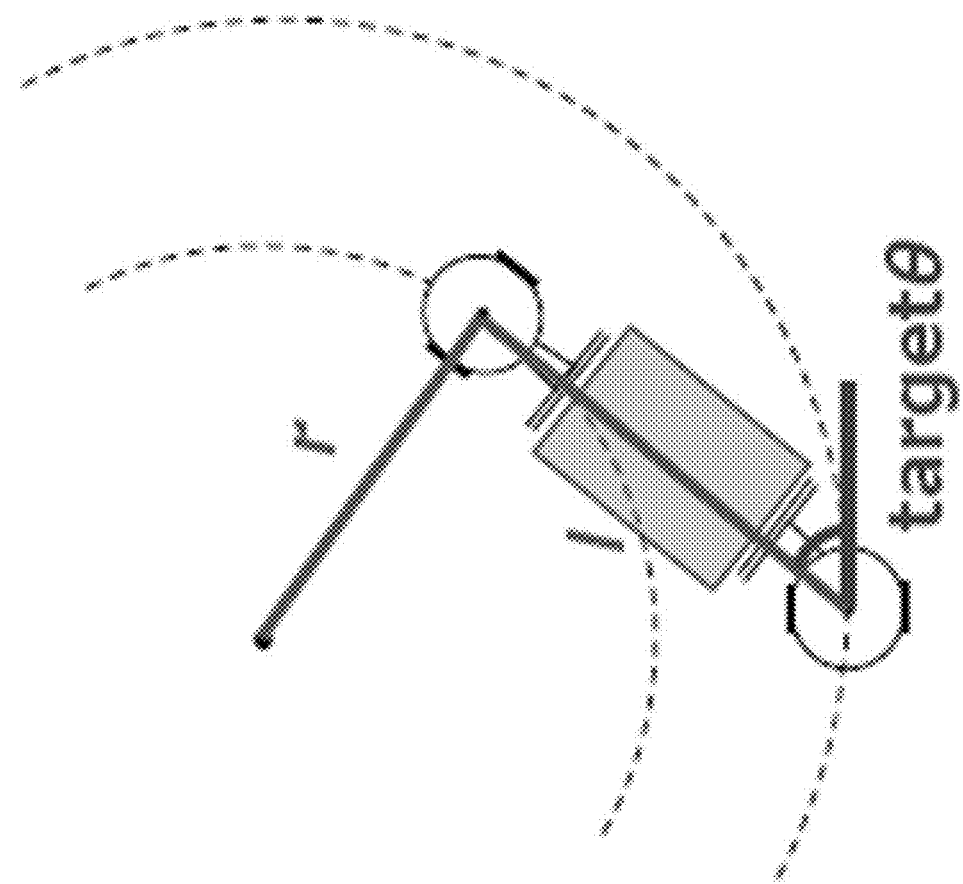
FIG. 17 is an image diagram of a target value of a rotation angle of the rotation mechanism of the follower transport robot in a curve when the transport system according to the first exemplary embodiment collaboratively transports the transport object.

Next, an operation of the follower transport robot when the transport system according to the first exemplary embodiment collaboratively transports the transport object will be described with reference to the drawings. FIG. 16 is a flowchart schematically showing an operation of the follower transport robot when the transport system according to the first exemplary embodiment collaboratively transports the transport object. FIG. 17 is an image diagram of a target value (target 0) of a rotation angle of the rotation mechanism of the follower transport robot on a curve when the transport system according to the first exemplary embodiment collaboratively transports the transport object.

First, the control part 16 of the follower transport robot 2B acquires information of a destination(s) (including an intermediate destination and a final destination), and an instruction of the collaborative transportation from outside (not shown; for example, an information communication terminal capable of near field communication, a network to which an information processing apparatus is connected) through the communication part 17, when the transport system sandwiches the transport object 5 (Step C1).

After Step C1, the control part 16 of the follower transport robot 2B starts a control loop of the drive parts 12 and 13 at a predetermined time (for example, tens of ms) (Steps C2 to C9).

After Step C1; after Step C7; or after Step C9, in the control loop, the control part 16 of the follower transport robot 2B acquires information (for example, position coordinates) of a current location of the leader transport robot 2A. (Step C2). Here, the current location of the leader transport robot 2A may be acquired from the leader transport robot 2A through the communication part 17; or may be acquired from the outside through the communication part 17. Alternatively, the current location of the leader transport robot 2A may be calculated and acquired by itself based on: an own position acquired from a position detection part (not shown; for example, a GPS (Global Positioning System) receiver, a beacon receiver, etc.) comprised in the transport robot 2; a size of the transport object 5 (distance between the transport robots 2A and 2B); and a rotation angle of the arms 41 and 43 of the rotation mechanism 40.

Next, in the control loop, the control part 16 of the follower transport robot 2B determines whether or not the acquired current location of the leader transport robot 2A has reached the acquired destination (for example, the nearest destination in front) (for example, whether or not it is within the predetermined radius of the destination) (Step C3). When the destination has been reached (YES in Step C3), the process proceeds to Step C8.

When the destination has not been reached (NO in Step C3), in the control loop, the control part 16 of the follower transport robot 2B determines target values of: a load of the follower transport robot 2B (a distance between the plate members 31 and 32 is also possible); and a rotation angle (Step C4). For example, when a motion range of the plate member 31 relative to the plate member 32 is 10 mm to 30 mm, a target value according to a distance (corresponding to a load) between the plate members 31 and 32 can be determined (for example, determined to 20 mm) at least according to a weight of the transport object 5. Also, a target value according to a rotation angle can be determined at least according to a curvature of the transport object 5 during transportation (radius r of the leader transport robot 2A) and a size (distance 1 between the transport robots 2A and 2B) of the transport object 5. When going straight, a target value according to a rotation angle can be set to 0°.

When going on a curve, for example, a target value according to a rotation angle can be set to arctan 2 (1, r) (see FIG. 17). In FIG. 17, "1" represents a distance between centers of gravity of the transport robots 2A and 2B; "r" represents a curvature radius of an orbit of a center of gravity of the leader transport robot 2A; and "target θ" represents a target value of a rotation angle (corresponding to an angle formed by a traveling direction of the leader transport robot 2A and a traveling direction of the follower transport robot 2B) of the arms 41 and 43 of the rotation mechanism 40 relative to the main body 10 of the transport robot 2B.

Next, the control part 16 of the follower transport robot 2B acquires: information of a load (in the case of the distance sensor, a distance d between plates) from the load sensor 23 of the follower transport robot 2B; and information of a rotation angle θ of the arms 41 and 43 of the rotation mechanism 40 from the angle sensor 24 (Step C5).

Next, the control part 16 of the follower transport robot 2B calculates control amounts (for example, rotation speeds of the wheels 20 and 21) of the left and right drive parts 12 and 13 of the follower transport robot 2B so that a load and a rotation angle approach target values based on: the determined target value, the acquired load (in the case of the distance sensor, distance d between plates); and the rotation angle θ (Step C6).

Next, the control part 16 of the follower transport robot 2B controls each of the drive parts 12 and 13 of the follower transport robot 2B based on the calculated control amount (Step C7), and then returns to Step C2.

When the destination has been reached (YES in Step C3), in the control loop, the control part 16 of the follower transport robot 2B determines whether or not a current location of the leader transport robot 2A has reached the final destination (for example, whether or not there is within the predetermined radius of the final destination) (Step C8). When the final destination has been reached (YES in Step C8), the process proceeds to Step C10.

When the final destination has not been reached (NO in Step C8), in the control loop, the control part 16 of the follower transport robot 2B updates a destination to the nearest destination in front (Step C9), and then returns to Step C2.

When the final destination has been reached (YES in Step C8), the control part 16 of the follower transport robot 2B goes out of the control loop to stop the controls of the drive parts 12 and 13 of the follower transport robot 2B (Step C10), and then ends.

Figure 18:
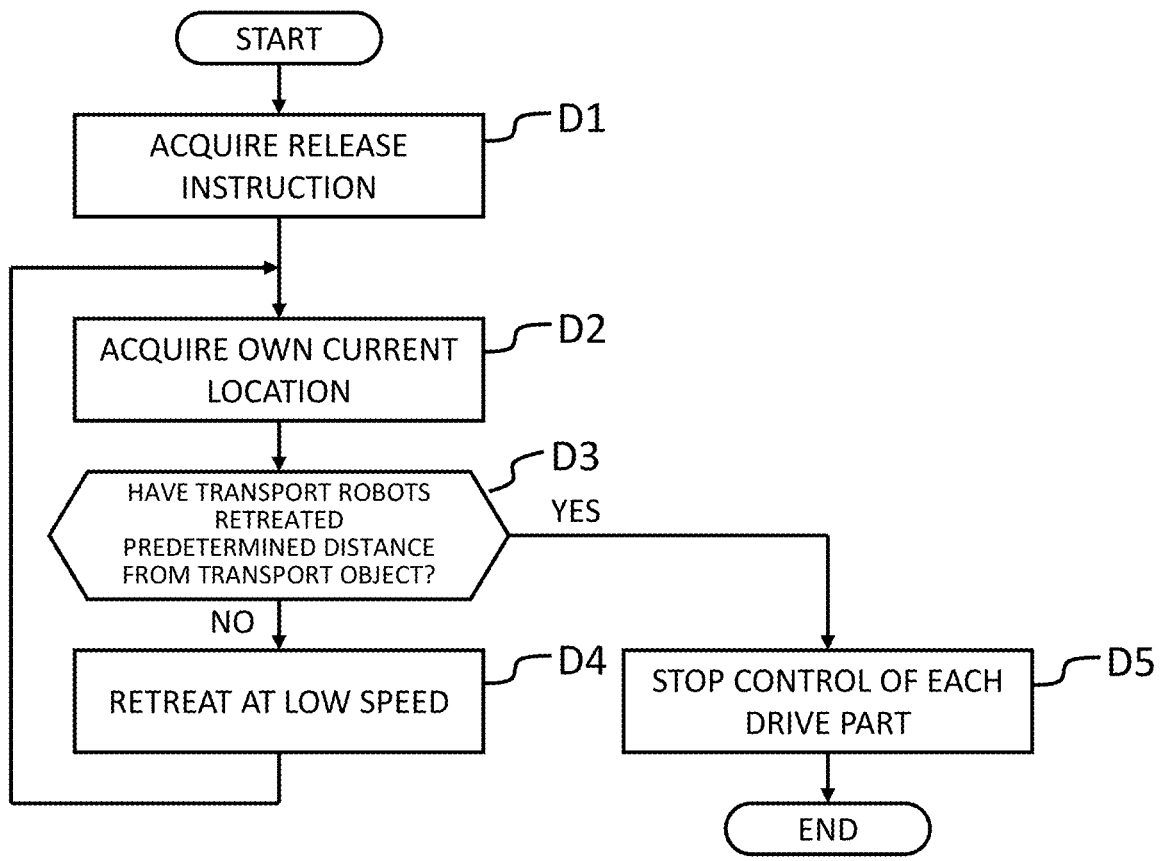
FIG. 18 is a flowchart which schematically shows an operation of the transport robots when the transport system according to the first exemplary embodiment releases the transport object.
Figure 19A:
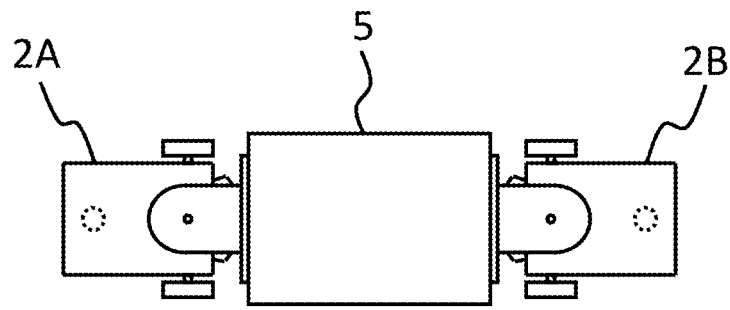
FIGS. 19A-19C are image diagrams of the operation of the transport robots when the transport system according to the first exemplary embodiment releases the transport object.
Figure 19B:
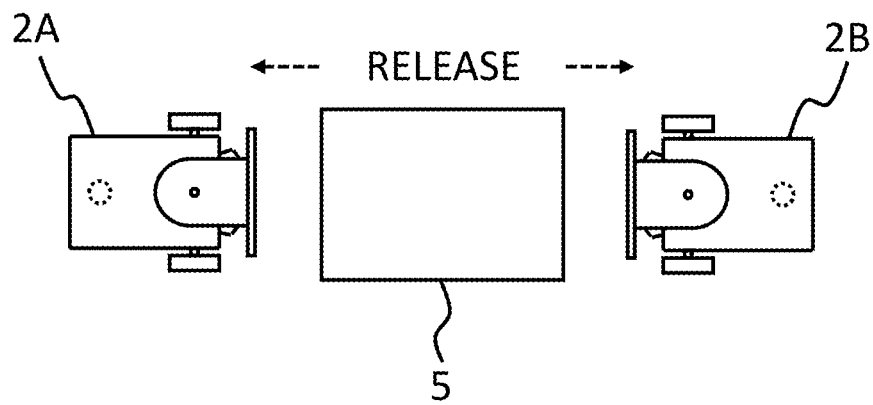
Figure 19C:
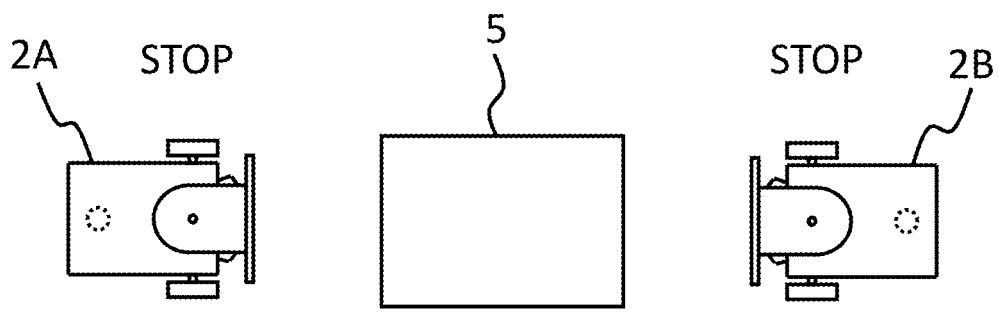

Next, an operation of the transport robots when the transport system according to the first exemplary embodiment releases the transport object will be described with reference to the drawings. FIG. 18 is a flowchart schematically showing an operation of the transport robots when the transport system according to the first exemplary embodiment releases the transport object. FIGS. 19A-19C are image diagrams of the operation of the transport robots when the transport system according to the first exemplary embodiment releases the transport object.

First, the control parts 16 of the transport robots 2A and 2B acquire instruction of release of the transport object 5 from outside (not shown; for example, an information communication terminal capable of near field communication, a network to which an information processing apparatus is connected) through the communication part 17. (Step D1).

After Step D1, the control parts 16 of the transport robots 2A and 2B start a control loop of the drive parts 12 and 13 in a predetermined time (for example, tens of ms) (Steps D2 to D4).

After Step D1 or after Step D4, in the control loop, the control parts 16 of the transport robots 2A and 2B acquire information (for example, position coordinates) of an own current location of the transport robots 2A and 2B (Step D2). Here, the own current location may be acquired from outside through the communication part 17; may be calculated and acquired by oneself based on encoder values and control history of the drive parts 12 and 13; or may be acquired from a position detection part (not shown; for example, a GPS (Global Positioning System) receiver, a beacon receiver, etc.) comprised in the transport robots 2A and 2B.

Next, the control parts 16 of the transport robots 2A and 2B determine whether or not the transport robots 2A and 2B have retreated by a predetermined distance from the transport object 5 based on the acquired current location (Step D3). When retreating by the predetermined distance (YES in Step D3), the process proceeds to Step D5.

When not retreating by the predetermined distance (NO in Step D3), the control parts 16 of the transport robots 2A and 2B control the drive parts 12 and 13 so that the transport robots 2A and 2B retreat at a low speed (Step D4; FIG. 19B), and then return to Step D2.

When retreating by the predetermined distance (YES in Step D3), the control parts 16 of the transport robots 2A and 2B go out of the control loop to stop controls of the drive parts 12 and 13 (Step D5), and then end.

According to the first exemplary embodiment, when transporting the transport object 5, the control apparatus (controller) 3 is used to control a plurality of transport robots 2A and 2B, and the transport object 5 is transported in a state sandwiched between the plurality of transport robots 2A and 2B, thereby it is possible to contribute to transportation of transport object 5 without modifying various types of transport object 5 as it is and without reloading the transport object 5. In particular, by providing the contact part 30 and the rotation mechanism 40 on the transport robots 2A and 2B and performing feedback-control by the load sensor 23 and the angle sensor 24, it is possible to contribute to stable transportation of the transport object 5.

Exemplary Embodiment 2

Figure 20:
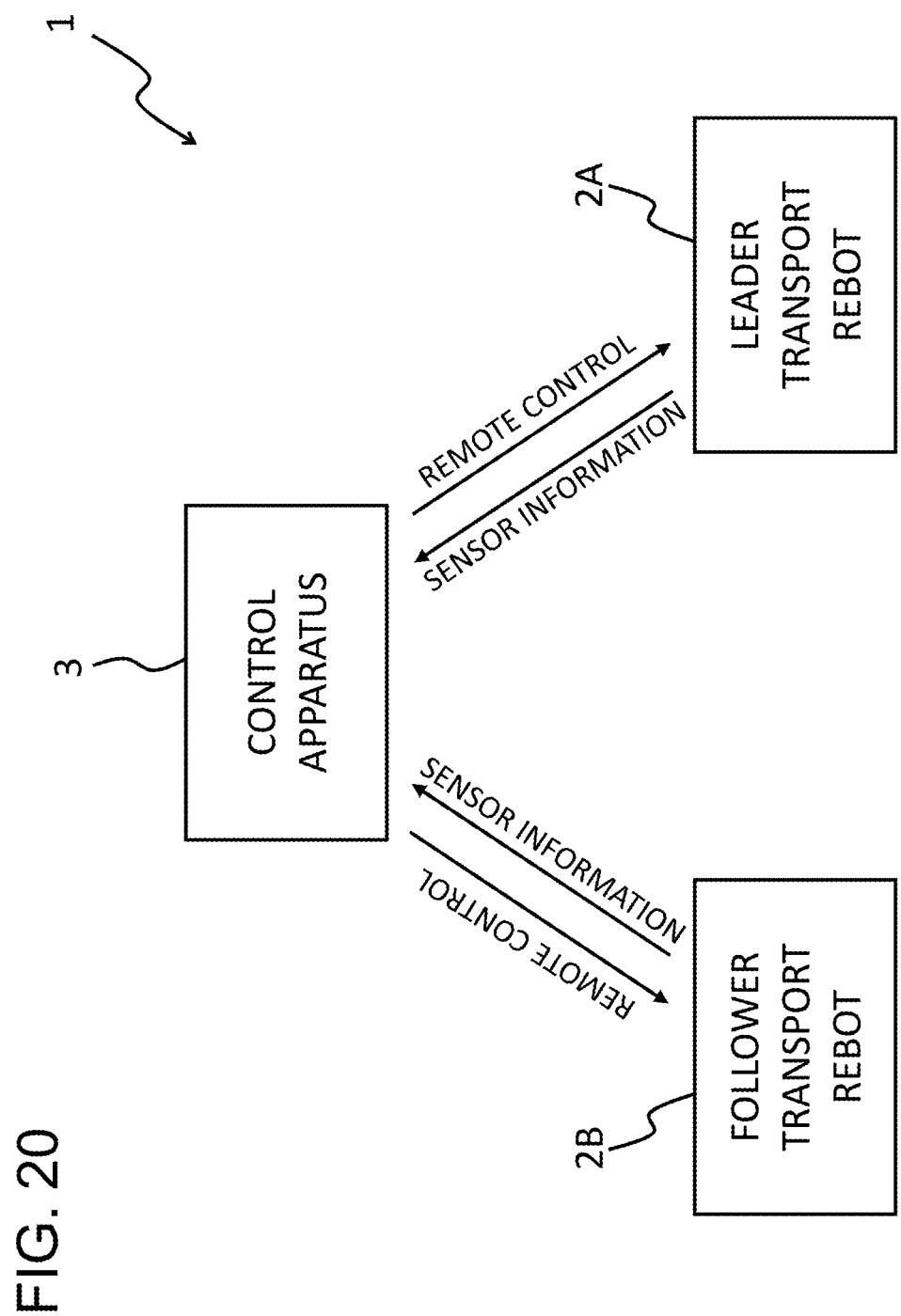
FIG. 20 is a block diagram schematically showing a configuration of a transport system according to a second exemplary embodiment.

A transport system according to a second exemplary embodiment will be described with reference to drawings. FIG. 20 is a block diagram schematically showing a configuration of the transport system according to the second exemplary embodiment.

The second exemplary embodiment is a modification of the first exemplary embodiment, and instead of autonomously controlling (local control) by a plurality of transport robots 2A and 2B that have received transport instructions, a control apparatus (controller) 3 that has received the transport request remotely controls the transport robots 2A and 2B (see FIG. 20).

The transport robots 2A and 2B can be connected to the control apparatus 3 so as to be able to communicate (for example, communication using wireless LAN, infrared rays, or Bluetooth (registered trademark)). The transport robots 2A and 2B are remotely controlled by the control apparatus 3. The transport robots 2A and 2B have a function of transmitting information (sensor information) of a load (pushing force) and a rotation angle detected by a load sensor (23 in FIG. 4) and an angle sensor (24 in FIG. 4) to the control apparatus 3. Other configurations of the transport robots 2A and 2B are the same as those of the first exemplary embodiment (see FIGS. 1 to 11).

The control apparatus 3 is an apparatus that manages and remotely controls the transport robots 2A and 2B. As the control apparatus 3, for example, a computer apparatus comprising a memory, a processor, and the like can be used. The control apparatus 3 can be connected to the transport robots 2A and 2B and an external apparatus (not shown; for example, a tablet terminal, a mobile communication terminal, etc.) so as to be able to communicate (for example, communication using wireless LAN, infrared rays, Bluetooth (registered trademark)). The control apparatus 3 has a function of acquiring information of current locations of the plurality of transport robots 2A and 2B. Information of the current locations of the transport robots 2A and 2B may be acquired using shooting data from a camera (not shown) that shoots images of the transport robots 2A and 2B; may be calculated to be acquired based on encoder values and the control history of the drive parts (12, 13 in FIG. 4) of the transport robots 2A and 2B; or may be acquired from a position detection part (not shown; for example, a GPS (Global Positioning System) receiver, a beacon receiver, etc.) comprised in the transport robots 2A and 2B. The control apparatus 3 starts remote controls of the transport robots 2A and 2B when receiving a destination (including an intermediate destination(s) and a final destination) and a transport request from outside (not shown; for example, an information communication terminal capable of near field communication, a network to which an information processing apparatus is connected).

The control apparatus 3 has a function of acquiring information of a load (pushing force) detected by the load sensors (23 in FIG. 4) of the transport robots 2A and 2B from the transport robots 2A and 2B. The control apparatus 3 controls (feedback-controls) the drive parts 12 and 13 of the transport robots 2A and 2B so that a load when the contact part (30 in FIG. 1) contacts the transport object (5 in FIG. 1) approaches a target value based on information of a load acquired (received) from the transport robots 2A and 2B. That is, in order to maintain a state in which the transport robots 2A and 2B sandwich the transport object (5 in FIG. 1) with a constant force, the control apparatus 3 adjusts driving forces of the drive parts 12 and 13 of the transport robots 2A and 2B using a load (a distance between plate members (31 and 32 in FIG. 5) is also possible) from a load sensor (23 in FIG. 4) as a guide value. The target value of the load is the same as that of the first exemplary embodiment.

The control apparatus 3 controls the follower transport robot 2B so as to follow the leader transport robot 2A while pressing (pushing) the transport object 5 and the leader transport robot 2A so that a load (pushing force) approaches a target value, based on information of the load acquired (received) from a load sensor (23 in FIG. 4) of the follower transport robot 2B. The control apparatus 3 causes the follower transport robot 2B to accelerate when the load is smaller than the target value (when the distance between the plate members (31 and 32 in FIG. 5) is too large). The control apparatus 3 causes the follower transport robot 2B to decelerate when the load is larger than the target value (when the distance between the plate members (31 and 32 in FIG. 5) is too close).

The control apparatus 3 controls the leader transport robot 2A so as to receive the transport object 5 pressed (pushed) by the follower transport robot 2B and proceed so that a load approaches a target value based on information of a load acquired (received) from the load sensor (23 in FIG. 4) of the leader transport robot 2A. The control apparatus 3 causes the leader transport robot 2A to decelerate when the load is smaller than the target value (when the distance between the plate members (31 and 32 in FIG. 5) is too far). The control apparatus 3 causes the leader transport robot 2A to accelerate when the load is larger than the target value (when the distance between the plate members (31 and 32 in FIG. 5) is too close).

The control apparatus 3 has a function of acquiring information of a rotation angle detected by an angle sensor (24 in FIG. 4) of the transport robots 2A and 2B from the transport robots 2A and 2B. The control apparatus 3 controls (feedback-controls) drive parts (12, 13 in FIG. 4) of the transport robots 2A and 2B so that a rotation angle of an arm (41 in FIG. 6) of a rotation mechanism (40 in FIG. 6) approaches a target value based on information of an angle acquired (received) from an angle sensor (24 in FIG. 4). The control apparatus 3 sets a speed difference between drive parts (12, 13 in FIG. 4) of the follower transport robot 2B so as to follow a traveling direction of the leader transport robot 2A by using an angle from an angle sensor (24 in FIG. 4) of the follower transport robot 2B as a guide value, and adjusts a rotation speed of drive parts (12, 13 in FIG. 4) so as to move in a direction in which the leader transport robot 2A is located. For example, when a rotation angle of a contact part (30 in FIG. 1) relative to a main body (10 in FIG. 1) of the follower transport robot 2B is on the right side, a rotation speed of a drive part (12 in FIG. 4) for a left wheel (20 in FIG. 1) is accelerated, and a rotation speed of a drive part (13 in FIG. 4) for a right wheel (21 in FIG. 1) is decelerated or maintained. A target value of a rotation angle is the same as that of the first exemplary embodiment.

According to the second exemplary embodiment, when transporting the transport object 5, by controlling the plurality of transport robots 2A and 2B using the control apparatus 3, and transporting the transport objects 5 sandwiched between the plurality of transport robots 2A and 2B, similarly to the first exemplary embodiment, it is possible to contribute to transporting various types of transport object as it is without reloading a freight. In particular, by providing the contact part 30 and the rotation mechanism 40 in the transport robots 2A and 2B and performing feedback-control by the load sensor 23 and the angle sensor 24, it is possible to contribute to stable transportation of the transport object 5. Also, by controlling the transport robots 2A and 2B through the control apparatus 3, burdens of information processing in the transport robots 2A and 2B can be reduced, and an operation can be performed for a long time.

Third Exemplary Embodiment

Figure 21:
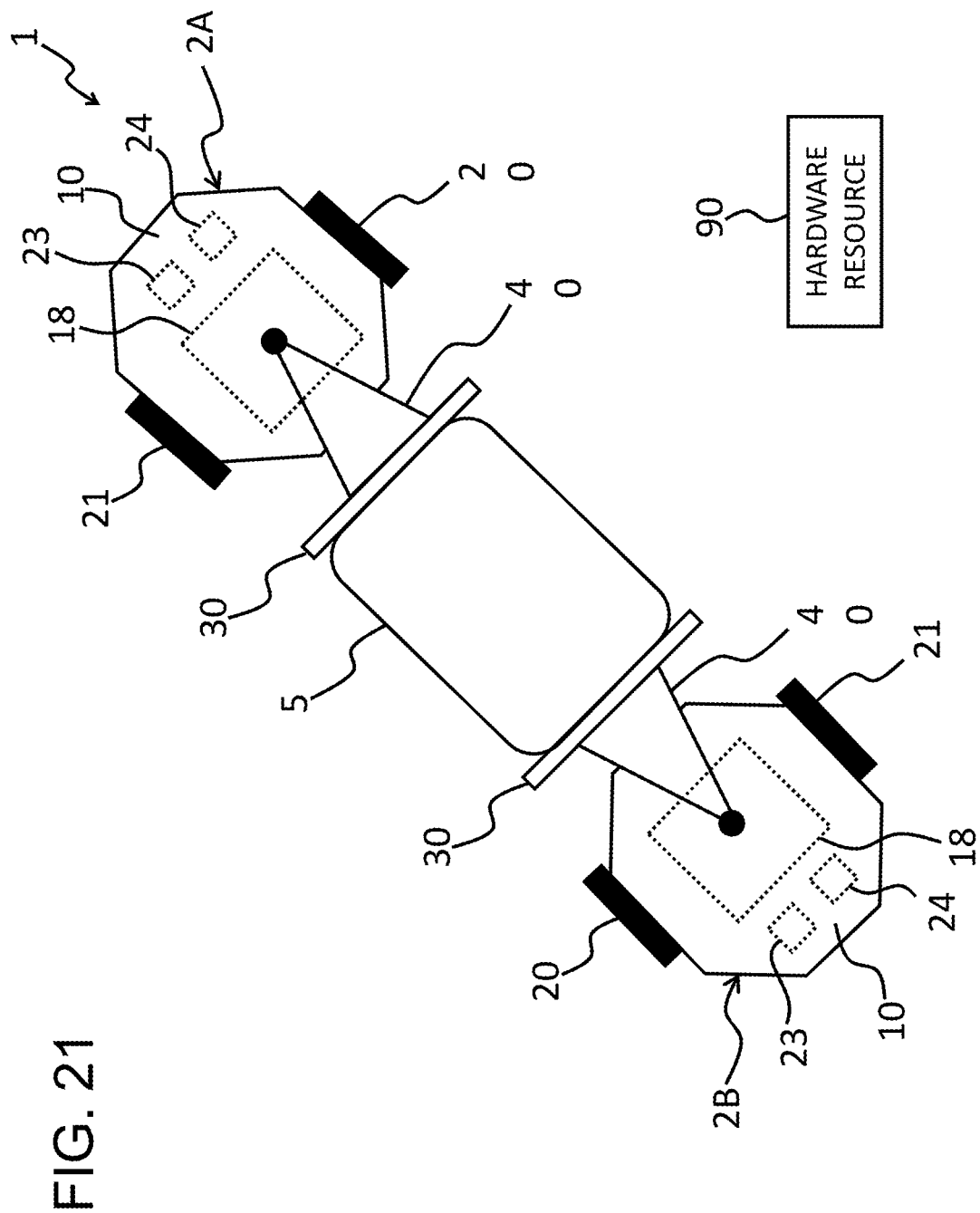
FIG. 21 is a block diagram schematically showing a configuration of a transport system according to a third exemplary embodiment.

A transport system according to a third exemplary embodiment will be described with reference to drawings. FIG. 21 is a block diagram schematically showing a configuration of the transport system according to the third exemplary embodiment.

Figure 22:
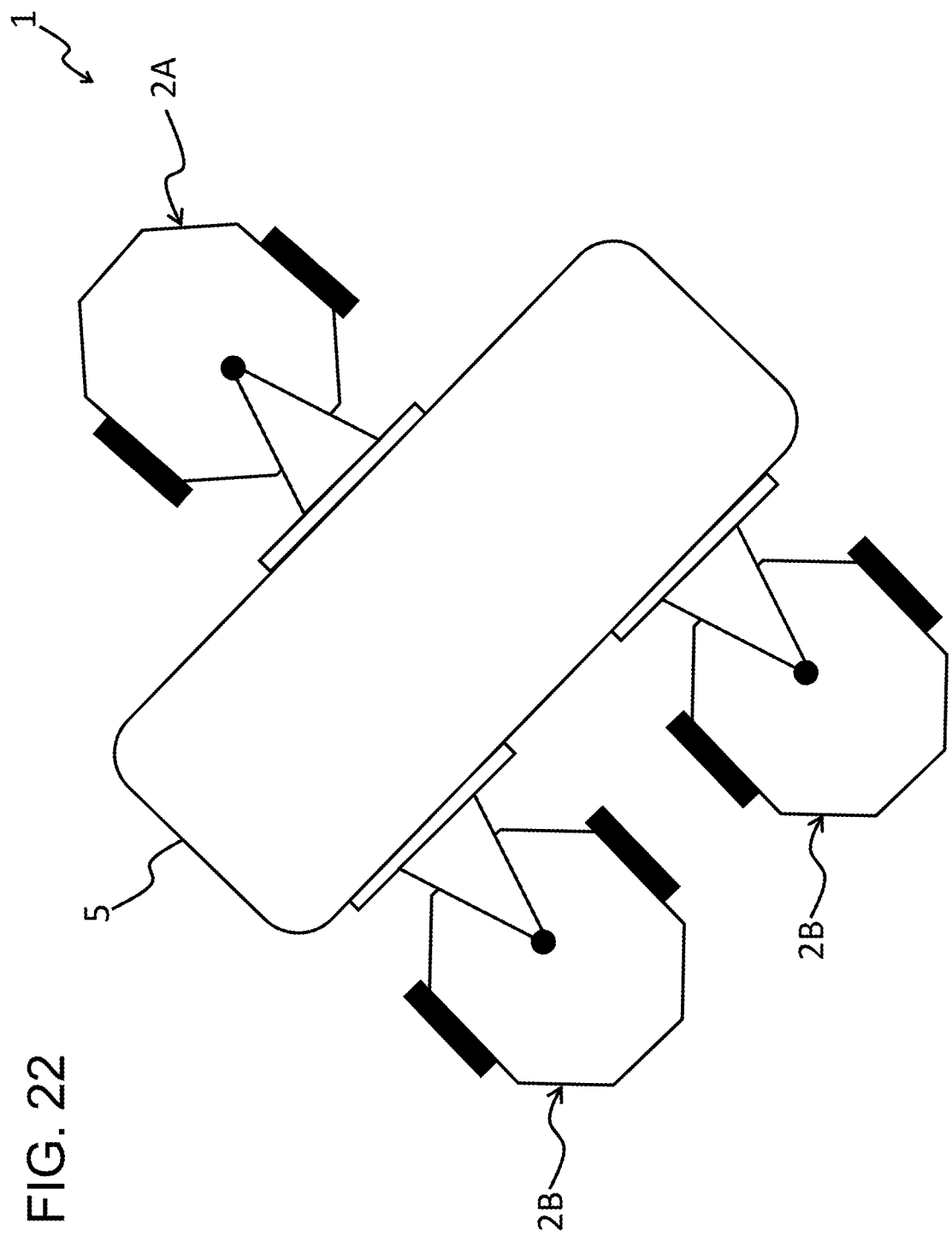
FIG. 22 is a block diagram schematically showing a configuration of a modified example of the transport system according to the third exemplary embodiment.

The transport system 1 is a system that transports a transport object 5 in a state sandwiching the transport object 5 between a plurality of transport robots 2A and 2B (two in FIG. 21, three or more as shown in FIG. 22 is also possible).

The transport robots 2A and 2B each comprise: a main body 10; wheels 20, 21; a contact part 30 that contacts the transport object 5; a rotation mechanism 40 that makes the contact part 30 rotatable relative to the main body 10; a drive part(s) 18 that is/are mounted on the main body 10 and configured to drive the wheels 20 and 21; a load sensor 23 that detects a load when the contact part 30 contacts the transport object 5; and an angle sensor 24 that detects a rotation angle of the contact part 30 relative to the main body 10.

The transport system 1, using hardware resources 90, executes processings of: controlling the drive parts 12 and 13 so that when the contact part 30 contacts the transport object 5, the load (pushing force) approaches a first target value based on information of a load detected by the load sensor 23; and controlling the drive parts 12 and 13 so that the rotation angle of the contact part 30 relative to the main body 10 approaches a second target value based on information of a rotation angle detected by the angle sensor 24.

According to the third exemplary embodiment, similarly to the first exemplary embodiment, it is possible to contribute to stable transportation of various types of transport object 5 as it is without modifying the transport object 5 and without reloading the transport object 5. In particular, by providing the contact part 30 and the rotation mechanism 40 in the transport robots 2A and 2B and performing feedback-control by the load sensor 23 and the angle sensor 24, it is possible to contribute to the stable transportation of the transport object 5.

Figure 23:
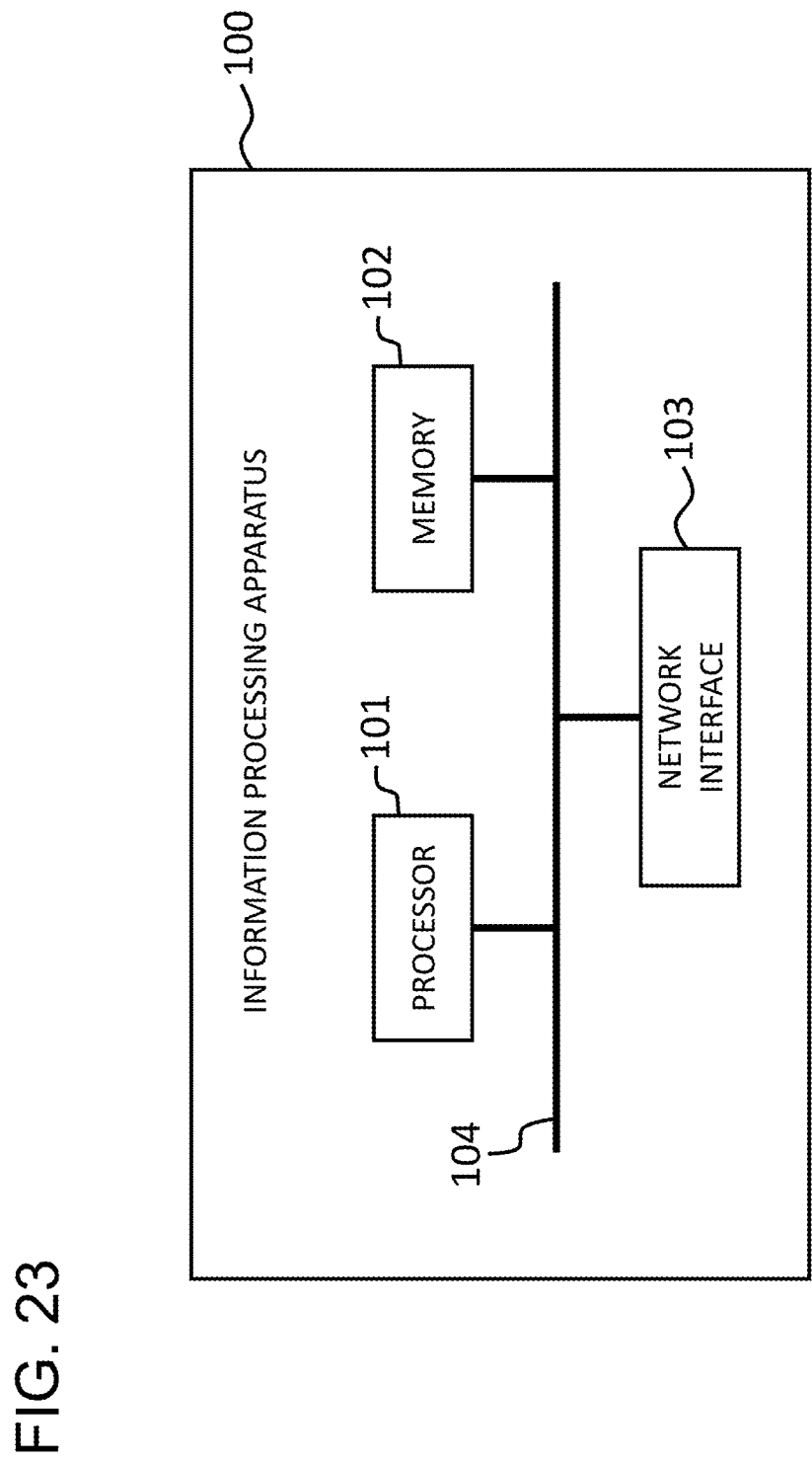
FIG. 23 is a block diagram schematically showing a configuration of an information processing apparatus.

The control part and the communication part of the transport robot according to the first exemplary embodiment, the control apparatus according to the second exemplary embodiment, and the hardware resources according to the third exemplary embodiment can be configured of so-called information processing apparatus (computer, hardware resources) and ones comprising a configuration exemplarily showed in FIG. 23 can be used. For example, an information processing apparatus 100 comprises: a processor 101; a memory 102; a network interface 103; and the like, which are connected to each other by an internal bus 104.

Note that the configuration shown in FIG. 23 is not intended to limit a hardware configuration of the information processing apparatus 100. The information processing apparatus 100 may include a hardware(s) (for example, an input/output interface) not shown. Alternatively, the number of units such as the processor 101 included in the information processing apparatus 100 is not limited to the example shown in FIG. 23, and for example, a plurality of processors 101 may be included in the information processing apparatus 100.

As the processor 101, for example, a CPU (Central Processing Unit), an MPU (Micro Processor Unit), or the like can be used.

As the memory 102, for example, a RAM (Random Access Memory), a ROM (Read Only Memory), an HDD (Hard Disk Drive), an SSD (Solid State Drive), or the like can be used.

As the network interface 103, for example, a LAN (Local Area Network) card, a network adapter, a network interface card, or the like can be used.

A function of the information processing apparatus 100 is realized by the above-mentioned processing module. The processing module is implemented, for example, by the processor 101 executing a program stored in the memory 102. Also, the program can be downloaded via a network or updated using a storage medium in which the program is stored. Further, the processing module may be realized by a semiconductor chip. That is, a function executed by the processing module may be implemented by executing software in certain hardware.

Part or all of the above exemplary embodiment may be described as the following modes, but is not limited to the following modes.

[Mode 1]
In the present invention, the mode of the transport system according to the first aspect is possible.

[Mode 2]
The transport system according to Mode 1, wherein the processing of controlling the drive part(s) comprises processings of: determining the first target value according to at least a weight of the transport object; acquiring information of the load detected by the load sensor; and controlling the drive part(s) so that when the contact part contacts the transport object, the load approaches the determined first target value based on the acquired information of the load.

[Mode 3]
The transport system according to Mode 1 or 2, wherein the contact part comprises: two plates; and an elastic member(s) arranged between the two plates, and wherein the load sensor detects a load when the contact part contacts the transport object based on a distance between the two plates.

[Mode 4]
The transport system according to any one of Modes 1 to 3, wherein the processing of controlling the drive part(s) comprises processings of: determining the second target value according to at least curvature during transportation of the transport object; acquiring information of the rotation angle detected by the angle sensor; and controlling the drive part(s) so that the rotation angle of the contact part relative to the main body approaches the determined second target value based on the acquired information of the rotation angle.

[Mode 5]
The transport system according to any one of Modes 1 to 4, wherein the transport robot further comprises a control part that executes controlling the drive part(s), as the hardware resources.

[Mode 6]
The transport system according to any one of Modes 1 to 4, wherein the transport system further comprises a control apparatus that controls the transport robots, as the hardware resources, wherein the control apparatus executes controlling the drive part(s), and wherein the processing of controlling the drive part(s) comprises processings of: acquiring information of the load detected by the load sensor from the transport robot and controlling the drive part(s) based on the acquired information of the load; and acquiring information of the rotation angle detected by the angle sensor from the transport robot and controlling the drive part(s) based on the acquired information of the rotation angle.

[Mode 7]
In the present invention, a Mode of the transport robot according to the second aspect is possible.

[Mode 8]
In the present invention, a Mode of the control apparatus according to the third aspect is possible.

[Mode 9]
In the present invention, a Mode of the control method of the transport robot according to the fourth aspect is possible.

[Mode 10] In the present invention, a Mode of the program according to the fifth aspect is possible.

[Mode 11]
In the present invention, a Mode of the program according to the sixth aspect is possible.

It should be noted that each disclosure of the above PTLs shall be incorporated and described herein by reference and can be used as a basis or a part of the present invention as necessary. Within a framework of the entire disclosure of the present invention (including claims and drawings), it is possible to modify or adjust the exemplary embodiments or examples based on the basic technical idea thereof. Also, within the framework of all disclosure of the present invention, various combinations or selections (non-selection if necessary) of various disclosed elements (including each element of each claim, each element of each exemplary embodiment or example, each element of each drawing, etc.) is possible. That is, it goes without saying that the present invention includes all disclosures including claims and drawings, and various modifications and modifications that can be made by one skilled in the art in accordance with the technical concept. Further, as to the numerical values and numerical ranges described in the present application, it is considered that arbitrary intermediate values, lower numerical values, and small ranges are described even if not explicitly recited. Furthermore, it is also considered that a matter used to combine part or all of each of the disclosed matters of the above-cited documents with the matters described in this document as a part of the disclosure of the present invention, in accordance with the gist of the present invention, if necessary, is included in the disclosed matters of the present application.

REFERENCE SIGNS LIST

1 Transport system
2, 2A, 2B Transport robot
3 Control apparatus (controller)
5 Transport object
6 Freight
10 Main body
11 Frames
12, 13 Drive part
14, 15 Shaft
16 Control part
17 Communication part
18 Drive part
20, 21 Wheel
22 Caster
23 Load sensor
24 Angle sensor
30 Contact part
31, 32 Plate member
33 Friction part
34, 35, 36, 37 Elastic member
40 Rotation mechanism
41 Arm
41a, 41b Pin part
42 Shaft part
43 Arm
44, 45, 46, 47 Stay
50 Restoration mechanism
51 Swing member
51a, 51b Receiving surface
51c Pin part
52 Shaft part
53 Pin part
54 Elastic member
60 Guide mechanism
61 Guide member
61a Guide surface
70 Pedestal
71, 72, 73, 74 Caster
80 Floor
81 Axis
90 Hardware resources
100 Information processing apparatus
101 Processor
102 Memory
103 Network interface
104 Internal bus

What is claimed is:

1. A transport system that transports a transport object in a state sandwiching the transport object between a plurality of transport robots,
wherein each of the plurality of transport robots comprises:
a main body;
wheels;
a contact part that contacts the transport object;
a rotation mechanism that makes the contact part rotatable relative to the main body;
at least one drive part that is mounted on the main body and configured to drive the wheels;
a load sensor that detects a load when the contact part contacts the transport object; and
an angle sensor that detects a rotation angle of the contact part relative to the main body, and
wherein using hardware resources, processing is performed that comprises:
controlling the at least one drive part so that when the contact part contacts the transport object, the load approaches a first target value based on information of the load detected by the load sensor; and
controlling the at least one drive part so that the rotation angle of the contact part relative to the main body approaches a second target value based on information of the rotation angle detected by the angle sensor.

2. The transport system according to claim 1,
wherein controlling the at least one drive part comprises:
determining the first target value according to at least a weight of the transport object;
acquiring the information of the load detected by the load sensor; and
controlling the at least one drive part so that when the contact part contacts the transport object the load approaches the determined first target value based on the acquired information of the load.

3. The transport system according to claim 2,
wherein the contact part comprises:
two plates; and
at least one elastic member arranged between the two plates, and
wherein the load sensor detects the load when the contact part contacts the transport object based on a distance between the two plates.

4. The transport system according to claim 3,
wherein controlling the at least one drive part comprises:
determining the second target value according to at least a curvature during transportation of the transport object;
acquiring the information of the rotation angle detected by the angle sensor; and
controlling the at least one drive part so that the rotation angle of the contact part relative to the main body approaches the determined second target value based on the acquired information of the rotation angle.

5. The transport system according to claim 4, wherein each of the plurality of transport robots further comprises a control part that performs controlling of the at least one drive part, as the hardware resources.

6. The transport system according to claim 3, wherein each of the plurality of transport robots further comprises a control part that performs controlling of the at least one drive part, as the hardware resources.

7. The transport system according to claim 2,
wherein controlling the at least one drive part comprises:
determining the second target value according to at least a curvature during transportation of the transport object;
acquiring the information of the rotation angle detected by the angle sensor; and
controlling the at least one drive part so that the rotation angle of the contact part relative to the main body approaches the determined second target value based on the acquired information of the rotation angle.

8. The transport system according to claim 7, wherein each of the plurality of transport robots further comprises a control part that performs controlling of the at least one drive part, as the hardware resources.

9. The transport system according to claim 2, wherein each of the plurality of transport robots further comprises a control part that performs controlling of the at least one drive part, as the hardware resources.

10. The transport system according to claim 2,
wherein the transport system further comprises a control apparatus that controls the plurality of transport robots, as the hardware resources,
wherein the control apparatus performs controlling of the at least one drive part,
wherein controlling the at least one drive part comprises:
acquiring the information of the load detected by the load sensor from each of the plurality of transport robots and controlling the at least one drive part based on the acquired information of the load; and
acquiring the information of the rotation angle detected by the angle sensor from each of the plurality of transport robots and controlling the at least one drive part based on the acquired information of the rotation angle.

11. The transport system according to claim 1,
wherein controlling the at least one drive part comprises:
determining the second target value according to at least a curvature during transportation of the transport object;
acquiring the information of the rotation angle detected by the angle sensor; and
controlling the at least one drive part so that the rotation angle of the contact part relative to the main body approaches the determined second target value based on the acquired information of the rotation angle.

12. The transport system according to claim 11, wherein each of the plurality of transport robots further comprises a control part that performs controlling of the at least one drive part, as the hardware resources.

13. The transport system according to claim 1, wherein each of the plurality of transport robots further comprises a control part that performs controlling of the at least one drive part, as the hardware resources.

14. The transport system according to claim 1,
wherein the transport system further comprises a control apparatus that controls the plurality of transport robots, as the hardware resources,
wherein the control apparatus performs controlling of the at least one drive part,
wherein controlling the at least one drive part comprises:
acquiring the information of the load detected by the load sensor from each of the plurality of transport robots and controlling the at least one drive part based on the acquired information of the load; and
acquiring the information of the rotation angle detected by the angle sensor from each of the plurality of transport robots and controlling the at least one drive part based on the acquired information of the rotation angle.

15. The transport system according to claim 1,
wherein the contact part comprises:
two plates; and
at least one elastic member arranged between the two plates, and
wherein the load sensor detects the load when the contact part contacts the transport object based on a distance between the two plates.

16. The transport system according to claim 15,
wherein controlling the at least one drive part comprises:
determining the second target value according to at least a curvature during transportation of the transport object;
acquiring the information of the rotation angle detected by the angle sensor; and
controlling the at least one drive part so that the rotation angle of the contact part relative to the main body approaches the determined second target value based on the acquired information of the rotation angle.

17. The transport system according to claim 16, wherein each of the plurality of transport robots further comprises a control part that performs controlling of the at least one drive part, as the hardware resources.

18. The transport system according to claim 15, wherein each of the plurality of transport robots further comprises a control part that performs controlling of the at least one drive part, as the hardware resources.

19. A transport robot configured to transport a transport object while sandwiching the transport object by cooperating with one or more other transport robot,
wherein the transport robot comprises:
a main body;
wheels;
a contact part that contacts the transport object;
a rotation mechanism that makes the contact part rotatable relative to the main body;

at least one drive part that is mounted on the main body and configured to drive the wheels;

a control part that controls the at least one drive part;

a load sensor that detects a load when the contact part contacts the transport object; and an angle sensor that detects a rotation angle of the contact part relative to the main body, wherein the control part executes processings of:

controlling the at least one drive part so that when the contact part contacts the transport object, the load approaches a first target value based on information of the load detected by the load sensor; and controlling the at least one drive part so that the rotation angle of the contact part relative to the main body approaches a second target value based on information of the rotation angle detected by the angle sensor.

20. A control method for controlling a plurality of transport robots that sandwich a transport object and cooperate with each other to transport the transport object, wherein each of the plurality of transport robots comprises:

a main body;

wheels;

a contact part that contacts the transport object;

a rotation mechanism that makes the contact part rotatable relative to the main body;

at least one drive part that is mounted on the main body and configured to drive the wheels;

a load sensor that detects a load when the contact part contacts the transport object; and an angle sensor that detects a rotation angle of the contact part relative to the main body, wherein the control method comprises:

controlling the at least one drive part so that when the contact part contacts the transport object, the load approaches a first target value based on information of the load detected by the load sensor; and controlling the at least one drive part so that the rotation angle of the contact part relative to the main body approaches a second target value based on information of the rotation angle detected by the angle sensor.

* * * * *